(12) United States Patent
Sasaki

(10) Patent No.: US 11,714,359 B2
(45) Date of Patent: Aug. 1, 2023

(54) ELECTROPHOTOGRAPHIC PHOTOSENSITIVE MEMBER, PROCESS CARTRIDGE, AND IMAGE FORMING APPARATUS

(71) Applicant: FUJIFILM Business Innovation Corp., Tokyo (JP)

(72) Inventor: Takaakira Sasaki, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 17/405,091

(22) Filed: Aug. 18, 2021

(65) Prior Publication Data

US 2022/0373901 A1    Nov. 24, 2022

(30) Foreign Application Priority Data

May 14, 2021    (JP) .................. 2021-082267

(51) Int. Cl.
- G03G 5/047    (2006.01)
- G03G 5/07    (2006.01)
- G03G 15/01    (2006.01)
- C08L 31/08    (2006.01)
- C08L 27/06    (2006.01)

(52) U.S. Cl.
CPC .............. *G03G 5/047* (2013.01); *C08L 27/06* (2013.01); *C08L 31/08* (2013.01); *G03G 5/071* (2013.01); *G03G 15/0131* (2013.01)

(58) Field of Classification Search
CPC ................................ G03G 5/047; G03G 5/071
See application file for complete search history.

(56) References Cited

U.S. PATENT DOCUMENTS 7,462,431 B2 * 12/2008 Chen ................ G03G 5/061443
430/96
10,409,179 B1 * 9/2019 Miyamoto ........... G03G 5/0539

FOREIGN PATENT DOCUMENTS

| JP | H05-19507 A | 1/1993 |
| JP | H0519507 A * | 1/1993 |

OTHER PUBLICATIONS

English machine translation of the description of JP-H0519507-A (Year: 2022).*

* cited by examiner

*Primary Examiner* — Peter L Vajda
*Assistant Examiner* — Boone Alexander Evans
(74) *Attorney, Agent, or Firm* — Oliff PLC

(57) ABSTRACT

An electrophotographic photosensitive member includes: a conductive support; a charge generation layer disposed on the conductive support, the charge generation layer including a charge generating material and a vinyl copolymer, the vinyl copolymer including a structural unit including a chlorine atom, a structural unit including an acyloxy group, and a structural unit including an aromatic polycarboxylic acid structure, a proportion of the structural unit including a chlorine atom to all the structural units being 80% by mass or more, a proportion of the structural unit including an aromatic polycarboxylic acid structure to all the structural units being 0.5% by mass or more; and a charge transport layer disposed on the charge generation layer, the charge transport layer including a charge transporting material and a binder resin.

16 Claims, 3 Drawing Sheets

ELECTROPHOTOGRAPHIC PHOTOSENSITIVE MEMBER, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2021-082267 filed May 14, 2021.

BACKGROUND

(i) Technical Field

The present disclosure relates to an electrophotographic photosensitive member, a process cartridge, and an image forming apparatus.

(ii) Related Art

Japanese Laid Open Patent Application Publication No. H5-19507 discloses an electrophotographic photosensitive member that includes a conductive support and at least a multilayer photosensitive layer that is disposed on the conductive support and includes a charge generation layer and a charge transport layer, the charge generation layer including a moisture absorbent including a polybasic acid compound having two or more carboxyl groups per molecule.

SUMMARY

In the production of an electrophotographic photosensitive member that includes a conductive support, a charge generation layer disposed on the conductive support, and a charge transport layer disposed on the charge generation layer, for example, a charge generation layer is formed on a conductive support, a charge transport layer forming coating liquid including a solvent is then applied to the charge generation layer, and the resulting coating film is dried to form a charge transport layer. In the case where the charge generation layer includes a charge generating material and a vinyl copolymer, when the charge transport layer forming coating liquid is applied to the charge generation layer, the solvent included in the charge transport layer forming coating liquid may dissolve part of the vinyl copolymer included in the charge generation layer.

In the step of applying the charge transport layer forming coating liquid to the charge generation layer, it is common to use dip coating. In dip coating, a conductive support including a charge generation layer disposed on the outer peripheral surface thereof is dipped into and withdrawn from a charge transport layer forming coating liquid with one of the ends of the conductive support in the axial direction facing downward. As a result, the charge transport layer forming coating liquid is deposited on the charge generation layer.

Therefore, the amount of time during which the charge generation layer is brought into contact with the charge transport layer forming coating liquid varies between the lower and upper ends of the conductive support in the axial direction. This may result in the differences in electric characteristics between the ends of the electrophotographic photosensitive member in the axial direction. Among the electric characteristics, a difference in sensitivity may cause a difference in image density.

Aspects of non-limiting embodiments of the present disclosure relate to an electrophotographic photosensitive member that includes a charge generation layer including a charge generating material and a vinyl copolymer and may reduce the difference in image density along the axial direction of the electrophotographic photosensitive member, compared with the case where the vinyl copolymer includes a structural unit including a chlorine atom, a structural unit including an acyloxy group, and a structural unit derived from maleic acid, the case where the proportion of the structural unit including a chlorine atom to all the structural units is less than 80% by mass, the case where the proportion of a structural unit including an aromatic polycarboxylic acid structure to all the structural units is less than 0.5% by mass, or the case where the solubility of the vinyl copolymer in 100 parts by mass of tetrahydrofuran is more than 10 parts by mass.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an electrophotographic photosensitive member including a conductive support; a charge generation layer disposed on the conductive support, the charge generation layer including a charge generating material and a vinyl copolymer, the vinyl copolymer including a structural unit including a chlorine atom, a structural unit including an acyloxy group, and a structural unit including an aromatic polycarboxylic acid structure, a proportion of the structural unit including a chlorine atom to all the structural units being 80% by mass or more, a proportion of the structural unit including an aromatic polycarboxylic acid structure to all the structural units being 0.5% by mass or more; and a charge transport layer disposed on the charge generation layer, the charge transport layer including a charge transporting material and a binder resin.

BRIEF DESCRIPTION OF THE DRAWINGS

Exemplary embodiments of the present disclosure will be described in detail based on the following figures, wherein.

DETAILED DESCRIPTION

Figure 1:
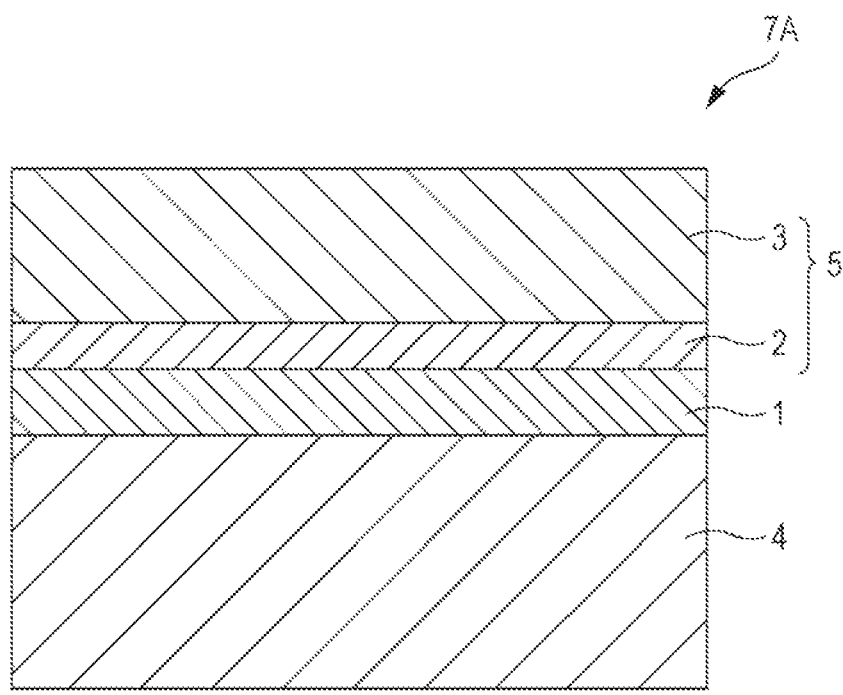
FIG. 1 is a schematic partial cross-sectional view of an electrophotographic photosensitive member according to an exemplary embodiment, illustrating an example of the structure of layers constituting the electrophotographic photosensitive member.

Exemplary embodiments of the present disclosure are described below. The following description and Examples below are intended to be illustrative of the exemplary embodiments and not restrictive of the scope of the present disclosure.

In the present disclosure, when numerical ranges are described in a stepwise manner, the upper or lower limit of a numerical range may be replaced with the upper or lower limit of another numerical range, respectively. In the present disclosure, the upper and lower limits of a numerical range may be replaced with the upper and lower limits described in Examples below.

Each of the components may include plural types of substances that correspond to the component.

In the case where a composition includes plural substances that correspond to a component of the composition, the content of the component in the composition is the total content of the plural substances in the composition unless otherwise specified.

Electrophotographic Photosensitive Member

First Exemplary Embodiment

An electrophotographic photosensitive member (hereinafter, referred to simply as "photosensitive member") according to a first exemplary embodiment includes a conductive support, a charge generation layer that is disposed on the conductive support and includes a charge generating material and a vinyl copolymer, and a charge transport layer that is disposed on the charge generation layer and includes a charge transporting material and a binder resin.

The vinyl copolymer includes a structural unit including a chlorine atom (hereinafter, this structural unit is referred to as "chlorine-containing component"), a structural unit including an acyloxy group (hereinafter, this structural unit is referred to as "acyloxy component"), and a structural unit including an aromatic polycarboxylic acid structure (hereinafter, this structural unit is referred to as "aromatic polycarboxylic acid component"). The proportion of the chlorine-containing component to all the structural units constituting the vinyl copolymer is 80% by mass or more. The proportion of the aromatic polycarboxylic acid component to all the structural units constituting the vinyl copolymer is 0.5% by mass or more.

The "chlorine-containing component (i.e., structural unit including a chlorine atom)" is a structural unit that includes a chlorine atom and does not include either an acyloxy group or two or more carboxyl groups. The chlorine-containing component may include another substituent group, such as an alkyl group. The "acyloxy component (i.e., structural unit including an acyloxy group)" may be any structural unit that includes an acyloxy group and does not include two or more carboxyl groups. The acyloxy component may include another substituent group, such as an alkyl group. The "aromatic polycarboxylic acid component (i.e., structural unit including an aromatic polycarboxylic acid structure)" may be any structural unit that includes an aromatic polycarboxylic acid structure. The aromatic polycarboxylic acid component may include a substituent group other than a carboxyl group, such as an alkyl group.

The above-described photosensitive member according to the first exemplary embodiment may reduce the difference in image density along the axial direction of the photosensitive member. The reasons are presumably as follows.

As described above, when the charge transport layer is formed on the charge generation layer disposed on the conductive support, commonly, a charge transport layer forming coating liquid is applied to the charge generation layer by dip coating and the resulting coating film is dried to form a charge transport layer. In this step, a solvent included in the charge transport layer forming coating liquid may dissolve part of the vinyl copolymer included in the charge generation layer. In dip coating, the amount of time during which the charge generation layer is brought into contact with the charge transport layer forming coating liquid varies between the lower and upper ends of the conductive support in the axial direction. This may result in the difference in sensitivity between the ends of the photosensitive member in the axial direction. The sensitivity difference may result in a difference in image density.

In contrast, in the first exemplary embodiment, the proportion of the chlorine-containing component to all the structural units constituting the vinyl copolymer is limited to be 80% by mass or more. Furthermore, the proportion of the aromatic polycarboxylic acid component to all the structural units constituting the vinyl copolymer is limited to be 0.5% by mass or more. It is considered that limiting the proportion of the chlorine-containing component to be 80% by mass or more and the proportion of the aromatic polycarboxylic acid component to be 0.5% by mass or more reduces the solubility of the vinyl copolymer in the solvent included in the charge transport layer forming coating liquid.

Specifically, when the vinyl copolymer includes the aromatic polycarboxylic acid component, the compound stability of the vinyl copolymer is enhanced and the solubility of the vinyl copolymer in the solvent is reduced accordingly compared with the case where the vinyl copolymer includes a structural unit derived from an aliphatic polycarboxylic acid, such as maleic acid, instead of the aromatic polycarboxylic acid component. Moreover, when the proportion of the aromatic polycarboxylic acid component in the vinyl copolymer is 0.5% by mass or more, the solubility of the vinyl copolymer in the solvent is also reduced compared with the case where the proportion of the aromatic polycarboxylic acid component is less than 0.5% by mass. It is also considered that, when the content of the chlorine-containing component in the vinyl copolymer is 80% by mass or more, the hardness of the vinyl copolymer is increased and the solubility of the vinyl copolymer in the solvent is reduced accordingly compared with the case where the content of the chlorine-containing component in the vinyl copolymer is less than 80% by mass.

Since the solubility of the vinyl copolymer in the solvent is low, even if the amount of time during which the charge generation layer is brought into contact with the charge transport layer forming coating liquid in dip coating varies between the lower and upper ends of the conductive support in the axial direction, the above sensitivity difference may be limited and the difference in image density along the axial direction of the photosensitive member, which may result from the sensitivity difference, may be reduced.

It is considered that the photosensitive member according to the first exemplary embodiment reduces the difference in image density along the axial direction of the photosensitive member for the above-described reasons.

Note that, when the solubility of the binder resin included in the charge generation layer in the solvent is high, the sensitivity of the photosensitive member may be increased. Specifically, when the solvent included in the charge transport layer forming coating liquid dissolves the binder resin included in the charge generation layer, the likelihood of the charge generating material being present at the interface between the charge generation layer and the charge transport layer is increased. The larger the amount of the charge generating material present at the interface between the charge generation layer and the charge transport layer, the higher the sensitivity of the photosensitive member.

In this regard, in the first exemplary embodiment, a high sensitivity may be achieved although the solubility of the vinyl copolymer in the solvent is low. The reasons are not clear but presumably as follows. Specifically, it is considered that the acyloxy component included in the vinyl copolymer enhances the dispersibility of the charge generating material in the vinyl copolymer. In addition, since the acyloxy component and the aromatic polycarboxylic acid component are used in combination in the first exemplary embodiment, the dispersibility of the charge generating material in the vinyl copolymer may be further enhanced. Since the dispersibility of the charge generating material in the vinyl copolymer is high, the charge generating material may be dispersed in the vicinity of the interface between the charge generation layer and the charge transport layer even when the solubility of the vinyl copolymer in the solvent is low and, consequently, a further high sensitivity may be achieved. That is, the photosensitive member according to the first exemplary embodiment may reduce the difference in image density along the axial direction of the photosensitive member while achieving a high sensitivity.

Second Exemplary Embodiment

A photosensitive member according to a second exemplary embodiment includes a conductive support, a charge generation layer that is disposed on the conductive support and includes a charge generating material and a vinyl copolymer, and a charge transport layer that is disposed on the charge generation layer and includes a charge transporting material and a binder resin.

The vinyl copolymer includes a chlorine-containing component, an acyloxy component, and an aromatic polycarboxylic acid component. The solubility of the vinyl copolymer in 100 parts by mass of tetrahydrofuran at 30° C. (hereinafter, this property is referred to as "THF solubility") is 10 parts by mass or less.

The above-described photosensitive member according to the second exemplary embodiment may reduce the difference in image density along the axial direction of the electrophotographic photosensitive member. The reasons are presumably as follows.

As described above, when the charge transport layer is formed on the charge generation layer disposed on the conductive support, commonly, a charge transport layer forming coating liquid is applied to the charge generation layer by dip coating and the resulting coating film is dried to form a charge transport layer. In this step, a solvent included in the charge transport layer forming coating liquid may dissolve part of the vinyl copolymer included in the charge generation layer. In dip coating, the amount of time during which the charge generation layer is brought into contact with the charge transport layer forming coating liquid varies between the lower and upper ends of the conductive support in the axial direction. This may result in the difference in sensitivity between the ends of the electrophotographic photosensitive member in the axial direction. The sensitivity difference may result in a difference in image density.

In contrast, in the second exemplary embodiment, the vinyl copolymer includes an aromatic polycarboxylic acid component and the THF solubility is limited to be 10 parts by mass or less. It is considered that, therefore, the solubility of the vinyl copolymer in the solvent is low.

Since the solubility of the vinyl copolymer in the solvent is low, even if the amount of time during which the charge generation layer is brought into contact with the charge transport layer forming coating liquid in dip coating varies between the lower and upper ends of the conductive support in the axial direction, the above difference in sensitivity may be limited and the difference in image density along the axial direction of the electrophotographic photosensitive member, which may result from the sensitivity difference, may be reduced.

It is considered that the photosensitive member according to the second exemplary embodiment reduces the difference in image density along the axial direction of the electrophotographic photosensitive member for the above-described reasons.

Furthermore, in the second exemplary embodiment, a high sensitivity may be achieved although the solubility of the vinyl copolymer in the solvent is low. Specifically, the acyloxy component included in the vinyl copolymer may enhance the dispersibility of the charge generating material in the vinyl copolymer. Moreover, using the acyloxy component and the aromatic polycarboxylic acid component in combination may further enhance the dispersibility of the charge generating material in the vinyl copolymer. Since the dispersibility of the charge generating material in the vinyl copolymer is high, the charge generating material may be dispersed in the vicinity of the interface between the charge generation layer and the charge transport layer even when the solubility of the vinyl copolymer in the solvent is low and, consequently, a further high sensitivity may be achieved. That is, the photosensitive member according to the second exemplary embodiment may reduce the difference in image density along the axial direction of the photosensitive member while achieving a high sensitivity.

Hereinafter, a photosensitive member that corresponds to both photosensitive member according to the first exemplary embodiment and photosensitive member according to the second exemplary embodiment is referred to as "photosensitive member according to this exemplary embodiment". However, an example of the photosensitive member according to an exemplary embodiment may be any photosensitive member that corresponds to at least one of the photosensitive member according to the first exemplary embodiment and the photosensitive member according to the second exemplary embodiment.

The electrophotographic photosensitive member according to this exemplary embodiment is described below with reference to the attached drawings.

FIG. 1 is a schematic partial cross-sectional view of an electrophotographic photosensitive member 7A according to this exemplary embodiment, illustrating an example of the structure of layers constituting the electrophotographic photosensitive member 7A. The electrophotographic photosensitive member 7A illustrated in FIG. 1 includes a conductive support 4, an undercoat layer 1 disposed on the conductive support 4, a charge generation layer 2 disposed on the undercoat layer 1, and a charge transport layer 3 disposed on the charge generation layer 2. The charge generation layer 2 and the charge transport layer 3 constitute a photosensitive layer 5.

Note that the undercoat layer 1 is an optional layer. In other words, in the electrophotographic photosensitive member 7A, the charge generation layer 2 may be disposed directly on the conductive support 4 (i.e., without the undercoat layer 1 interposed therebetween).

The electrophotographic photosensitive member 7A may include other layers as needed. Examples of the other layers include a protection layer disposed on the charge transport layer 3.

The layers constituting the electrophotographic photosensitive member according to this exemplary embodiment are described in detail below. Note that the reference numerals used in the drawings are omitted hereinafter.

Conductive Support

Examples of the conductive support include a metal sheet, a metal drum, and a metal belt that are made of a metal such as aluminum, copper, zinc, chromium, nickel, molybdenum, vanadium, indium, gold, or platinum or an alloy such as stainless steel. Other examples of the conductive support include a paper sheet, a resin film, and a belt on which a conductive compound such as a conductive polymer or indium oxide, a metal such as aluminum, palladium, or gold, or an alloy is deposited by coating, vapor deposition, or lamination. The term "conductive" used herein refers to having a volume resistivity of less than $10^{13}$ Ωcm.

In the case where the electrophotographic photosensitive member is used as a component of a laser printer, the surface of the conductive support may be roughened such that the center-line average roughness Ra of the surface of the conductive support is 0.04 µm or more and 0.5 µm or less in order to reduce interference fringes formed when the photosensitive member is irradiated with a laser beam. On the other hand, it is not necessary to roughen the surface of the conductive support in order to reduce the formation of interference fringes in the case where an incoherent light source is used. However, roughening the surface of the conductive support may increase the service life of the photosensitive member by reducing the occurrence of defects caused due to the irregularities formed in the surface of the conductive support.

For roughening the surface of the conductive support, for example, the following methods may be employed: wet honing in which a suspension prepared by suspending abrasive particles in water is blown onto the surface of the conductive support; centerless grinding in which the conductive support is continuously ground with rotating grinding wheels brought into pressure contact with the conductive support; and an anodic oxidation treatment.

Another example of the roughening method is a method in which, instead of roughening the surface of the conductive support, a layer is formed on the surface of the conductive support by using a resin including conductive or semiconductive powder particles dispersed therein such that a rough surface is formed due to the particles dispersed in the layer.

In a roughening treatment using anodic oxidation, an oxidation film is formed on the surface of a conductive support made of a metal, such as aluminum, by performing anodic oxidation using the conductive support as an anode in an electrolyte solution. Examples of the electrolyte solution include a sulfuric acid solution and an oxalic acid solution. A porous anodic oxidation film formed by anodic oxidation is originally chemically active and likely to become contaminated. In addition, the resistance of the porous anodic oxidation film is likely to fluctuate widely with the environment. Accordingly, the porous anodic oxidation film may be subjected to a pore-sealing treatment in which micropores formed in the oxide film are sealed using volume expansion caused by a hydration reaction of the oxidation film in steam under pressure or in boiled water that may include a salt of a metal, such as nickel, so as to be converted into a more stable hydrous oxide film.

The thickness of the anodic oxidation film may be, for example, 0.3 µm or more and 15 µm or less. When the thickness of the anodic oxidation film falls within the above range, the anodic oxidation film may serve as a barrier to injection. Furthermore, an increase in the potential that remains on the photosensitive member after the repeated use of the photosensitive member may be limited.

The conductive support may be subjected to a treatment in which an acidic treatment liquid is used or a boehmite treatment.

The treatment in which an acidic treatment liquid is used is performed in, for example, the following manner. An acidic treatment liquid that includes phosphoric acid, chromium acid, and hydrofluoric acid is prepared. The proportions of the phosphoric acid, chromium acid, and hydrofluoric acid in the acidic treatment liquid may be, for example, 10% by mass or more and 11% by mass or less, 3% by mass or more and 5% by mass or less, and 0.5% by mass or more and 2% by mass or less, respectively. The total concentration of the above acids may be 13.5% by mass or more and 18% by mass or less. The treatment temperature may be, for example, 42° C. or more and 48° C. or less. The thickness of the resulting coating film may be 0.3 µm or more and 15 µm or less.

In the boehmite treatment, for example, the conductive support is immersed in pure water having a temperature of 90° C. or more and 100° C. or less for 5 to 60 minutes or brought into contact with steam having a temperature of 90° C. or more and 120° C. or less for 5 to 60 minutes. The thickness of the resulting coating film may be 0.1 µm or more and 5 µm or less. The coating film may optionally be subjected to an anodic oxidation treatment with an electrolyte solution in which the coating film is hardly soluble, such as adipic acid, boric acid, a boric acid salt, a phosphoric acid salt, a phthalic acid salt, a maleic acid salt, a benzoic acid salt, a tartaric acid salt, or a citric acid salt.

Undercoat Layer

The undercoat layer includes, for example, inorganic particles and a binder resin.

The inorganic particles may have, for example, a powder resistivity (i.e., volume resistivity) of $10^2$ Ωcm or more and $10^{11}$ Ωcm or less.

Among such inorganic particles having the above resistivity, for example, metal oxide particles such as tin oxide particles, titanium oxide particles, zinc oxide particles, and zirconium oxide particles are preferable and zinc oxide particles are particularly preferable.

The BET specific surface area of the inorganic particles may be, for example, 10 m²/g or more.

The volume average diameter of the inorganic particles may be, for example, 50 nm or more and 2,000 nm or less and is preferably 60 nm or more and 1,000 nm or less.

The content of the inorganic particles is preferably, for example, 10% by mass or more and 80% by mass or less and is more preferably 40% by mass or more and 80% by mass or less of the amount of binder resin.

The inorganic particles may optionally be subjected to a surface treatment. It is possible to use two or more types of inorganic particles which have been subjected to different surface treatments or have different diameters in a mixture.

Examples of an agent used in the surface treatment include a silane coupling agent, a titanate coupling agent, an aluminum coupling agent, and a surfactant. In particular, a silane coupling agent is preferable, and a silane coupling agent including an amino group is more preferable.

Examples of the silane coupling agent including an amino group include, but are not limited to, 3-aminopropyltriethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltriethoxysilane.

Two or more silane coupling agents may be used in a mixture. For example, a silane coupling agent including an amino group may be used in combination with another type of silane coupling agent. Examples of the other type of silane coupling agent include, but are not limited to, vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

A method for treating the surface of the inorganic particles with the surface treating agent is not limited, and any known surface treatment method may be employed. Both dry process and wet process may be employed.

The amount of surface treating agent used may be, for example, 0.5% by mass or more and 10% by mass or less of the amount of inorganic particles.

The undercoat layer may include an electron accepting compound (i.e., an acceptor compound) in addition to the inorganic particles in order to enhance the long-term stability of electrical properties and carrier-blocking property.

Examples of the electron accepting compound include the following electron transporting substances: quinones, such as chloranil and bromanil; tetracyanoquinodimethanes; fluorenones, such as 2,4,7-trinitrofluorenone and 2,4,5,7-tetranitro-9-fluorenone; oxadiazoles, such as 2-(4-biphenyl)-5-(4-t-butylphenyl)-1,3,4-oxadiazole, 2,5-bis(4-naphthyl)-1,3,4-oxadiazole, and 2,5-bis(4-diethylaminophenyl)-1,3,4-oxadiazole; xanthones; thiophenes; and diphenoquinones, such as 3,3',5,5'-tetra-t-butyldiphenoquinone.

In particular, compounds including an anthraquinone structure may be used as an electron accepting compound. Examples of the compounds including an anthraquinone structure include hydroxyanthraquinones, aminoanthraquinones, and aminohydroxyanthraquinones. Specific examples thereof include anthraquinone, alizarin, quinizarin, anthrarufin, and purpurin.

The electron accepting compound may be dispersed in the undercoat layer together with the inorganic particles or deposited on the surfaces of the inorganic particles.

For attaching the electron accepting compound onto the surfaces of the inorganic particles, for example, a dry process or a wet process may be employed.

In a dry process, for example, while the inorganic particles are stirred with a mixer or the like capable of producing a large shearing force, the electron accepting compound or a solution prepared by dissolving the electron accepting compound in an organic solvent is added dropwise or sprayed together with dry air or a nitrogen gas to the inorganic particles in order to deposit the electron accepting compound on the surfaces of the inorganic particles. The addition or spraying of the electron accepting compound may be done at a temperature equal to or lower than the boiling point of the solvent used. Subsequent to the addition or spraying of the electron accepting compound, the resulting inorganic particles may optionally be baked at 100° C. or more. The temperature at which the inorganic particles are baked and the amount of time during which the inorganic particles are baked are not limited; the inorganic particles may be baked under appropriate conditions of temperature and time under which the intended electrophotographic properties are achieved.

In a wet process, for example, while the inorganic particles are dispersed in a solvent with a stirrer, an ultrasonic wave, a sand mill, an Attritor, a ball mill, or the like, the electron accepting compound is added to the dispersion liquid. After the resulting mixture has been stirred or dispersed, the solvent is removed such that the electron accepting compound is deposited on the surfaces of the inorganic particles. The removal of the solvent may be done by, for example, filtration or distillation. Subsequent to the removal of the solvent, the resulting inorganic particles may optionally be baked at 100° C. or more. The temperature at which the inorganic particles are baked and the amount of time during which the inorganic particles are baked are not limited; the inorganic particles may be baked under appropriate conditions of temperature and time under which the intended electrophotographic properties are achieved. In the wet process, moisture contained in the inorganic particles may be removed prior to the addition of the electron accepting compound. The removal of moisture contained in the inorganic particles may be done by, for example, heating the inorganic particles while being stirred in the solvent or by bringing the moisture to the boil together with the solvent.

The deposition of the electron accepting compound may be done prior or subsequent to the surface treatment of the inorganic particles with the surface treating agent. Alternatively, the deposition of the electron accepting compound and the surface treatment using the surface treating agent may be performed at the same time.

The content of the electron accepting compound may be, for example, 0.01% by mass or more and 20% by mass or less and is preferably 0.01% by mass or more and 10% by mass or less of the amount of inorganic particles.

Examples of the binder resin included in the undercoat layer include the following known materials: known high-molecular compounds such as an acetal resin (e.g., polyvinyl butyral), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a urea resin, a phenolic resin, a phenol-formaldehyde resin, a melamine resin, a urethane resin, an alkyd resin, and an epoxy resin; zirconium chelates; titanium chelates; aluminum chelates; titanium alkoxides; organotitanium compounds; and silane coupling agents.

Other examples of the binder resin included in the undercoat layer include charge transporting resins including a charge transporting group and conductive resins such as polyaniline.

Among the above binder resins, a resin insoluble in a solvent included in a coating liquid used for forming a layer on the undercoat layer may be used as a binder resin included in the undercoat layer. In particular, resins produced by reacting at least one resin selected from the group consisting of thermosetting resins (e.g., a urea resin, a phenolic resin, a phenol-formaldehyde resin, a melamine resin, a urethane resin, an unsaturated polyester resin, an alkyd resin, and an epoxy resin), polyamide resins, polyester resins, polyether resins, methacrylic resins, acrylic resins, polyvinyl alcohol resins, and polyvinyl acetal resins with a curing agent may be used.

In the case where two or more types of the above binder resins are used in combination, the mixing ratio may be set appropriately.

The undercoat layer may include various additives in order to enhance electrical properties, environmental stability, and image quality.

Examples of the additives include the following known materials: electron transporting pigments such as polycondensed pigments and azo pigments, zirconium chelates, titanium chelates, aluminum chelates, titanium alkoxides, organotitanium compounds, and silane coupling agents. The silane coupling agents, which are used in the surface treatment of the inorganic particles as described above, may also be added to the undercoat layer as an additive.

Examples of silane coupling agents that may be used as an additive include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelates include zirconium butoxide, zirconium ethyl acetoacetate, zirconium triethanolamine, acetylacetonate zirconium butoxide, ethyl acetoacetate zirconium butoxide, zirconium acetate, zirconium oxalate, zirconium lactate, zirconium phosphonate, zirconium octanoate, zirconium naphthenate, zirconium laurate, zirconium stearate, zirconium isostearate, methacrylate zirconium butoxide, stearate zirconium butoxide, and isostearate zirconium butoxide.

Examples of the titanium chelates include tetraisopropyl titanate, tetra-n-butyl titanate, butyl titanate dimer, tetra-(2-ethylhexyl) titanate, titanium acetylacetonate, polytitanium acetylacetonate, titanium octylene glycolate, titanium lactate ammonium salt, titanium lactate, titanium lactate ethyl ester, titanium triethanolaminate, and polyhydroxy titanium stearate.

Examples of the aluminum chelates include aluminum isopropylate, monobutoxy aluminum diisopropylate, aluminum butyrate, diethyl acetoacetate aluminum diisopropylate, and aluminum tris(ethyl acetoacetate).

The above additives may be used alone. Alternatively, two or more types of the above additives may be used in a mixture or in the form of a polycondensate.

The undercoat layer may have a Vickers hardness of 35 or more.

In order to reduce the formation of moiré fringes, the surface roughness (i.e., ten-point average roughness) of the undercoat layer may be adjusted to $1/(4n)$ to $\frac{1}{2}$ of the wavelength $\lambda$ of the laser beam used as exposure light, where n is the refractive index of the layer that is to be formed on the undercoat layer.

Resin particles and the like may be added to the undercoat layer in order to adjust the surface roughness of the undercoat layer. Examples of the resin particles include silicone resin particles and crosslinked polymethyl methacrylate resin particles. The surface of the undercoat layer may be ground in order to adjust the surface roughness of the undercoat layer. For grinding the surface of the undercoat layer, buffing, sand blasting, wet honing, grinding, and the like may be performed.

The method for forming the undercoat layer is not limited, and known methods may be employed. The undercoat layer may be formed by, for example, forming a coating film using a coating liquid prepared by mixing the above-described components with a solvent (hereinafter, this coating liquid is referred to as "undercoat layer forming coating liquid"), drying the coating film, and, as needed, heating the coating film.

Examples of the solvent used for preparing the undercoat layer forming coating liquid include known organic solvents, such as an alcohol solvent, an aromatic hydrocarbon solvent, a halogenated hydrocarbon solvent, a ketone solvent, a ketone alcohol solvent, an ether solvent, and an ester solvent.

Specific examples thereof include the following common organic solvents: methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

For dispersing the inorganic particles in the preparation of the undercoat layer forming coating liquid, for example, known equipment such as a roll mill, a ball mill, a vibrating ball mill, an Attritor, a sand mill, a colloid mill, and a paint shaker may be used.

For coating the conductive support with the undercoat layer forming coating liquid, for example, common methods such as blade coating, wire bar coating, spray coating, dip coating, bead coating, air knife coating, and curtain coating may be employed.

The thickness of the undercoat layer is preferably, for example, 15 μm or more and is more preferably 20 μm or more and 50 μm or less.

Intermediate Layer

Although not illustrated in the drawings, an intermediate layer may optionally be interposed between the undercoat layer and the photosensitive layer.

The intermediate layer includes, for example, a resin. Examples of the resin included in the intermediate layer include the following high-molecular compounds: acetal resins (e.g., polyvinyl butyral), polyvinyl alcohol resins, polyvinyl acetal resins, casein resins, polyamide resins, cellulose resins, gelatin, polyurethane resins, polyester resins, methacrylic resins, acrylic resins, polyvinyl chloride resins, polyvinyl acetate resins, vinyl chloride-vinyl acetate-maleic anhydride resins, silicone resins, silicone-alkyd resins, phenol-formaldehyde resins, and melamine resins.

The intermediate layer may include an organometallic compound. Examples of the organometallic compound included in the intermediate layer include organometallic compounds containing a metal atom such as a zirconium atom, a titanium atom, an aluminum atom, a manganese atom, or a silicon atom.

The above compounds included in the intermediate layer may be used alone. Alternatively, two or more types of the above compounds may be used in a mixture or in the form of a polycondensate.

In particular, the intermediate layer may include an organometallic compound containing a zirconium atom or a silicon atom.

The method for forming the intermediate layer is not limited, and known methods may be employed. The intermediate layer may be formed by, for example, forming a coating film using an intermediate layer forming coating liquid prepared by mixing the above-described components with a solvent, drying the coating film, and, as needed, heating the coating film.

For forming the intermediate layer, common coating methods such as dip coating, push coating, wire bar coating, spray coating, blade coating, knife coating, and curtain coating may be employed.

The thickness of the intermediate layer may be, for example, 0.1 μm or more and 3 μm or less. It is possible to use the intermediate layer also as an undercoat layer.

Charge Generation Layer

The charge generation layer is a layer that includes a charge generating material and, as a binder resin, a vinyl copolymer including a chlorine-containing component, an acyloxy component, and an aromatic polycarboxylic acid component. The charge generation layer may further include other components as needed.

Hereinafter, the vinyl copolymer including a chlorine-containing component, an acyloxy component, and an aromatic polycarboxylic acid component is referred to as "specific copolymer".

Charge Generating Material

Examples of the charge generating material include azo pigments, such as bisazo and trisazo; condensed aromatic pigments, such as dibromoanthanthrone; perylene pigments; pyrrolopyrrole pigments; phthalocyanine pigments; zinc oxide; and trigonal selenium.

Among the above charge generating materials, in particular, phthalocyanine pigments having high charge generating ability may be used. Examples of the phthalocyanine pigments include metal phthalocyanine pigments and nonmetal phthalocyanine pigments. Specific examples of such charge generating materials include the following phthalocyanine pigments: hydroxygallium phthalocyanine pigments disclosed in, for example, Japanese Laid Open Patent Application Publication Nos. H5-263007 and H5-279591, chlorogallium phthalocyanine pigments disclosed in, for example, Japanese Laid Open Patent Application Publication No. H5-98181, dichloro tin phthalocyanine pigments disclosed in, for example, Japanese Laid Open Patent Application Publication Nos. H5-140472 and H5-140473, and titanyl phthalocyanine pigments disclosed in, for example, Japanese Laid Open Patent Application Publication No. H4-189873.

Among the above phthalocyanine pigments, at least one selected from a hydroxygallium phthalocyanine pigment and a chlorogallium phthalocyanine pigment is preferably used and a hydroxygallium phthalocyanine pigment is more preferably used in consideration of charge generating ability.

In the case where a phthalocyanine pigment, which has a particularly high charge generating ability among the charge generating materials, is used (in particular, in the case where at least one selected from chlorogallium phthalocyanine and hydroxygallium phthalocyanine which have a particularly high charge generating ability among phthalocyanine pigments is used), when charge traps are present in the charge generation layer, the amount of charge accumulated is increased due to the high charge generating ability. This increases the occurrence of positive ghosting. However, since the specific copolymer is used as a binder resin in this exemplary embodiment as described above, the amount of charge traps formed is small. This presumably reduces the occurrence of positive ghosting even in the case where a phthalocyanine pigment is used as a charge generating material or, in particular, even in the case where at least one selected from chlorogallium phthalocyanine and hydroxygallium phthalocyanine is used as a generating material.

Among hydroxygallium phthalocyanine pigments, a Type-V hydroxygallium phthalocyanine pigment may be used.

In particular, for example, a hydroxygallium phthalocyanine pigment having a maximum peak wavelength at 810 nm or more and 839 nm or less in an absorption spectrum that covers a wavelength range of 600 nm or more and 900 nm or less may be used in order to achieve further high dispersibility.

The average particle diameter and BET specific surface area of the hydroxygallium phthalocyanine pigment having a maximum peak wavelength at 810 nm or more and 839 nm or less may fall within specific ranges. Specifically, the average particle diameter of the above hydroxygallium phthalocyanine pigment is preferably 0.20 μm or less and is more preferably 0.01 μm or more and 0.15 μm or less. The BET specific surface area of the above hydroxygallium phthalocyanine pigment is preferably 45 $m^2/g$ or more, is more preferably 50 $m^2/g$ or more, and is particularly preferably 55 $m^2/g$ or more and 120 $m^2/g$ or less. The term "average particle diameter" used herein refers to volume average particle diameter (d50 average particle diameter) measured by a laser diffraction/scattering particle size distribution analyzer "LA-700" produced by HORIBA, Ltd. The term "BET specific surface area" used herein refers to BET specific surface area measured by nitrogen purging using a BET specific surface area analyzer "FlowSorb 112300" produced by Shimadzu Corporation.

The maximum particle diameter (i.e., the maximum primary-particle diameter) of the hydroxygallium phthalocyanine pigment is preferably 1.2 μm or less, is more preferably 1.0 μm or less, and is further preferably 0.3 μm or less.

The hydroxygallium phthalocyanine pigment may have an average particle diameter of 0.2 μm or less, a maximum particle diameter of 1.2 μm or less, and a specific surface area of 45 $m^2/g$ or more.

The hydroxygallium phthalocyanine pigment may be a Type-V hydroxygallium phthalocyanine pigment having a diffraction peak at, at least, Bragg angles (2θ±0.2°) of 7.3°, 16.0°, 24.9°, and 28.0° in an X-ray diffraction spectrum measured with the CuKα radiation.

The above charge generating materials may be used alone or in combination of two or more.

The amount of the charge generating material may be, for example, 30% by volume or more and 80% by volume or less of the total amount of the charge generation layer. The amount of the charge generating material is preferably 40% by volume or more and 70% by volume or less and is more preferably 50% by volume or more and 60% by volume or less of the total amount of the charge generation layer in order to reduce the occurrence of positive ghosting.

Specific Copolymer

The specific copolymer is a vinyl copolymer including a chlorine-containing component, an acyloxy component, and an aromatic polycarboxylic acid component.

In the first exemplary embodiment, the proportion of the chlorine-containing component to all the structural units constituting the specific copolymer is 80% by mass or more, and the proportion of the aromatic polycarboxylic acid component to all the structural units constituting the specific copolymer is 0.5% by mass or more.

The proportion of each of the structural units to all the structural units can be determined by analyzing the specific copolymer by nuclear magnetic resonance (NMR).

The specific copolymer includes at least the chlorine-containing component, the acyloxy component, and the aromatic polycarboxylic acid component and may optionally include structural units other than the above structural units, such as a structural unit derived from a diol. The proportion of the other structural unit to all of the above structural units is preferably 5 mol % or less, is more preferably 3 mol % or less, and is further preferably 1 mol % or less. It is particularly preferable that the vinyl copolymer do not include the other structural units, that is, the specific copolymer be a copolymer composed only of the chlorine-containing component, the acyloxy component, and the aromatic polycarboxylic acid component.

Chlorine-Containing Component

As described above, the chlorine-containing component is a structural unit that includes a chlorine atom and does not include either an acyloxy group or two or more carboxyl groups.

The specific copolymer may include only one chlorine-containing component or two or more chlorine-containing components.

The number of chlorine atoms included in the chlorine-containing component is, for example, 1 to 5, is preferably 1 to 3, is more preferably 1 or 2, and is further preferably 1. The chlorine atom may be bonded directly to the straight chain of the chlorine-containing component.

Examples of the other substituent groups that may be included in the chlorine-containing component include an alkyl group, an alkoxy group, and a halogen atom other than a chlorine atom.

The chlorine-containing component may be a structural unit derived from vinyl chloride or a derivative of vinyl chloride.

The chlorine-containing component may be the structural unit represented by General Formula (1) below.

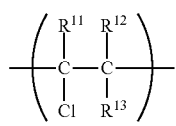

(1)

In General Formula (1), $R^{11}$ to $R^{13}$ each independently represent a hydrogen atom or an alkyl group having 1 to 5 carbon atoms.

In General Formula (1), $R^{11}$ to $R^{13}$ preferably each independently represent a hydrogen atom or an alkyl group having 1 to 5 carbon atoms, more preferably each independently represent a hydrogen atom or a methyl group, and further preferably represent a hydrogen atom.

In General Formula (1), $R^{11}$ to $R^{13}$ may be the same as or different from one another.

In particular, the chlorine-containing component may be a structural unit represented by General Formula (1) in which all of $R^{11}$ to $R^{13}$ represent a hydrogen atom.

Acyloxy Component

As described above, the acyloxy component is a structural unit including an acyloxy group.

The specific copolymer may include only one acyloxy component or two or more acyloxy components.

The number of acyloxy groups included in the acyloxy component is, for example, 1 or 2 and is preferably 1. The acyloxy group may be bonded directly to the straight chain of the acyloxy component.

Examples of the other substituent groups that may be included in the acyloxy component include an alkyl group, an alkoxy group, and a halogen atom.

The acyloxy component may be a structural unit derived from vinyl acetate or a derivative of vinyl acetate.

The acyloxy component may be the structural unit represented by General Formula (2) below.

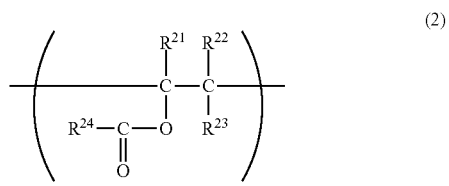

(2)

In General Formula (2), $R^{21}$ to $R^{23}$ each independently represent a hydrogen atom or an alkyl group having 1 to 5 carbon atoms, and $R^{24}$ represents an alkyl group having 1 to 5 carbon atoms.

In General Formula (2), $R^{21}$ to $R^{23}$ preferably each independently represent a hydrogen atom or an alkyl group having 1 to 5 carbon atoms, more preferably each independently represent a hydrogen atom or a methyl group, and further preferably represent a hydrogen atom.

In General Formula (2), $R^{21}$ to $R^{23}$ may be the same as or different from one another. In particular, it is preferable that all of $R^{21}$ to $R^{23}$ in General Formula (2) represent a hydrogen atom.

In General Formula (2), $R^{24}$ preferably represents an alkyl group having 1 to 5 carbon atoms, more preferably represents a methyl group or an ethyl group, and further preferably represents a methyl group.

In particular, the acyloxy component may be a structural unit represented by General Formula (2) in which all of $R^{21}$ to $R^{23}$ represent a hydrogen atom and $R^{24}$ represents a methyl group.

Aromatic Polycarboxylic Acid Component

As described above, the aromatic polycarboxylic acid component is a structural unit including an aromatic polycarboxylic acid structure.

The specific copolymer may include only one aromatic polycarboxylic acid component or two or more aromatic polycarboxylic acid components.

Examples of the aromatic ring included in the aromatic polycarboxylic acid component include a benzene ring and a naphthalene ring. Among these, a benzene ring may be used. The aromatic ring may be bonded to the backbone of the specific copolymer directly or with a linking group, such as an alkylene group, interposed between the backbone and the aromatic ring. It is preferable that aromatic ring be bonded directly to the backbone of the specific copolymer.

The number of carboxyl groups included in the aromatic polycarboxylic acid component is, for example, 2 to 4, is preferably 2 or 3, and is more preferably 2. In the aromatic polycarboxylic acid component, two or more carboxyl groups may be bonded to the aromatic ring directly or with a linking group, such as an alkylene group, interposed between the carboxyl groups and the aromatic ring. It is preferable that, in the aromatic polycarboxylic acid component, two or more carboxyl groups be all bonded to the aromatic ring directly.

Examples of other substituent groups that may be included in the aromatic polycarboxylic acid component include an alkyl group, an alkoxy group, and a halogen atom.

Examples of the aromatic polycarboxylic acid structure included in the aromatic polycarboxylic acid component include a phthalic acid structure, an isophthalic acid structure, a terephthalic acid structure, and a naphthalenedicarboxylic acid structure. Among these, a phthalic acid structure is preferable, and a phthalic acid structure that does not include any other substituent group is more preferable.

The aromatic polycarboxylic acid component preferably includes an aromatic polycarboxylic acid structure bonded directly to the backbone of the specific copolymer and more preferably includes a phthalic acid structure bonded directly to the backbone of the specific copolymer.

The aromatic polycarboxylic acid component may be a structural unit derived from phthalic acid, vinylphthalic acid, or a derivative thereof.

The aromatic polycarboxylic acid component may be a structural unit located at a terminal of the backbone of the specific copolymer, like the structural unit represented by Formula (3-1) below or a structural unit located at a position other than the terminals, like the structural unit represented by Formula (3-2) below. The aromatic polycarboxylic acid component is preferably a structural unit located at a terminal of the backbone of the specific copolymer.

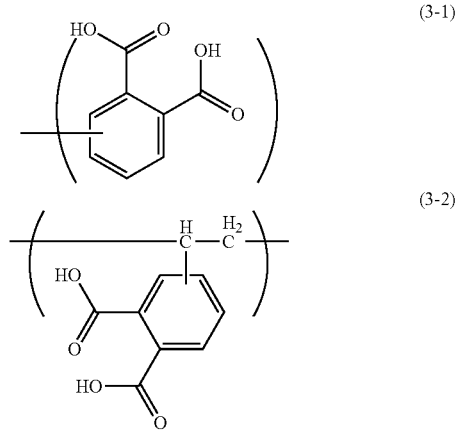

Combination of Components

The specific copolymer is preferably a copolymer including the structural unit represented by General Formula (1) as a chlorine-containing component and the structural unit represented by General Formula (2) as an acyloxy component and is more preferably a copolymer including the structural unit represented by General Formula (1), the structural unit represented by General Formula (2), and a structural unit having a phthalic acid structure.

The specific copolymer is further preferably a copolymer including, as a chlorine-containing component, the structural unit represented by General Formula (1) in which all of $R^{11}$ to $R^{13}$ represent a hydrogen atom and, as an acyloxy component, the structural unit represented by General Formula (2) in which all of $R^{21}$ to $R^{23}$ represent a hydrogen atom and $R^{24}$ represents a methyl group and is particularly preferably a copolymer including the structural unit represented by General Formula (1) in which all of $R^{11}$ to $R^{23}$ represent a hydrogen atom, the structural unit represented by General Formula (2) in which all of $R^{21}$ to $R^{23}$ represent a hydrogen atom and $R^{24}$ represents a methyl group, and a structural unit having a phthalic acid structure that does not include any other substituent groups.

Proportions of Components

The proportion of the chlorine-containing component is preferably 80% by mass or more, is more preferably 82% by mass or more, and is further preferably 85% by mass or more relative to all the components constituting the specific copolymer in order to reduce the difference in image density along the axial direction of the photosensitive member.

The proportion of the chlorine-containing component is preferably 88% by mass or less, is more preferably 87% by mass or less, and is further preferably 86% by mass or less relative to all the components constituting the specific copolymer in order to achieve a high sensitivity.

When the proportion of the chlorine-containing component is 87% by mass or less, the hardness of the vinyl copolymer is less likely to be increased to an excessive degree than in the case where the proportion of the chlorine-containing component is excessively high. This reduces the likelihood of the dispersibility of the charge generating material being degraded due to the excessively high hardness. When the proportion of the chlorine-containing component is 87% by mass or less, moreover, the proportion of the acyloxy component is increased relatively compared with the case where the proportion of the chlorine-containing component is excessively high. This enables the dispersibility of the charge generating material to be readily enhanced and consequently allows the charge generating material to be readily present in the vicinity of the interface between the charge generation layer and the charge transport layer. As a result, a high sensitivity may be achieved.

The proportion of the chlorine-containing component is preferably 80% by mass or more and 88% by mass or less, is more preferably 82% by mass or more and 87% by mass or less, and is further preferably 85% by mass or more and 86% by mass or less in order to achieve both reduction in the difference in image density along the axial direction of the photosensitive member and high sensitivity.

The proportion of the aromatic polycarboxylic acid component is preferably 0.5% by mass or more and is more preferably 0.8% by mass or more relative to all the components constituting the specific copolymer in order to reduce the difference in image density along the axial direction of the photosensitive member.

The proportion of the aromatic polycarboxylic acid component is preferably 2.5% by mass or less and is more preferably 1.5% by mass or less relative to all the components constituting the specific copolymer in order to achieve a high sensitivity.

When the proportion of the aromatic polycarboxylic acid component is 2.0% by mass or less, the proportion of the acyloxy component is increased relatively compared with the case where the proportion of the aromatic polycarboxylic acid component is excessively high. This enables the dispersibility of the charge generating material to be readily enhanced and consequently allows the charge generating material to be readily present in the vicinity of the interface between the charge generation layer and the charge transport layer. As a result, a high sensitivity may be achieved.

The proportion of the aromatic polycarboxylic acid component may be 0.5% by mass or more and 2.0% by mass or less in order to achieve both reduction in the difference in image density along the axial direction of the photosensitive member and high sensitivity.

When the proportion of the aromatic polycarboxylic acid component relative to all the components constituting the specific copolymer is defined as A [mass %] and the content of the charge generating material relative to the specific copolymer is defined as C [mass %], the ratio A/C is preferably $3.00 \times 10^{-3}$ or more and is more preferably $5.00 \times 10^{-3}$ or more in order to reduce the difference in image density along the axial direction of the photosensitive member.

The above ratio A/C is preferably $1.40 \times 10^{-2}$ or less and is more preferably $1.00 \times 10^{-2}$ or less in order to achieve high sensitivity.

The above ratio A/C is preferably $3.00 \times 10^{-3}$ or more and $1.40 \times 10^{-2}$ or less and is more preferably $5.00 \times 10^{-3}$ or more and $1.00 \times 10^{-2}$ or less in order to achieve both reduction in the difference in image density along the axial direction of the photosensitive member and high sensitivity.

The above weight average molecular weight is measured by gel permeation chromatography (GPC). In the measurement of molecular weight by GPC, GPC "HLC-8120GPC" produced by Tosoh Corporation is used as measuring equipment, a column "TSKgel SuperHM-M (15 cm)" produced by Tosoh Corporation is used, and THF is used as a solvent. Weight average molecular weight and number average molecular weight are calculated on the basis of the measurement results using a molecular weight calibration curve prepared using monodisperse polystyrene reference samples.

The solubility of the specific copolymer in 100 parts by mass of tetrahydrofuran at 30° C. (hereinafter, this property is referred to as "THF solubility") is preferably 10 parts by mass or less, is more preferably 8 parts by mass or less, and is further preferably 7.5 parts by mass or less in order to reduce the difference in image density along the axial direction of the photosensitive member.

The above THF solubility is determined by charging the polymer that is to be measured into tetrahydrofuran at 30° C., leaving the resulting solution to stand for 5 minutes, and then measuring the mass of the remaining polymer.

The method for producing the specific copolymer is not limited. The specific copolymer may be produced by, for example, polymerizing monomers that correspond to the respective structural units by suspension polymerization.

Other Additives

The charge generation layer may optionally include the additives known in the related art.

Formation of Charge Generation Layer

The method for forming the charge generation layer is not limited. Any known method may be employed. The charge generation layer may be formed by, for example, forming a coating film using a coating liquid prepared by mixing the above-described components with a solvent (hereinafter, this coating liquid is referred to as "charge generation layer forming coating liquid"), drying the coating film, and, as needed, heating the coating film.

Examples of the solvent used for preparing the charge generation layer forming coating liquid include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. The above solvents may be used alone or in a mixture of two or more.

For dispersing particles of the charge generating material or the like in the charge generation layer forming coating liquid, for example, media dispersing machines, such as a ball mill, a vibrating ball mill, an Attritor, a sand mill, and a horizontal sand mill; and medialess dispersing machines, such as a stirrer, an ultrasonic wave disperser, a roll mill, and a high-pressure homogenizer, may be used. Specific examples of the high-pressure homogenizer include an impact-type homogenizer in which a dispersion liquid is brought into collision with a liquid or a wall under a high pressure in order to perform dispersion and a through-type homogenizer in which a dispersion liquid is passed through a very thin channel under a high pressure in order to perform dispersion.

It is effective that the average diameter of the particles of the charge generating material dispersed in the charge generation layer forming coating liquid be 0.5 μm or less, be preferably 0.3 μm or less, and be further preferably 0.15 μm or less.

For applying the charge generation layer forming coating liquid to the undercoat layer (or, the intermediate layer), for example, common coating methods, such as blade coating, wire bar coating, spray coating, dip coating, bead coating, air knife coating, and curtain coating, may be employed.

The thickness of the charge generation layer is, for example, preferably 0.05 μm or more and 5.0 μm or less, is more preferably 0.1 μm or more and 2.0 μm or less, is further preferably 0.1 μm or more and 1.0 μm or less, and is particularly preferably 0.1 μm or more and 0.5 μm or less.

Charge Transport Layer

The charge transport layer is a layer including a charge transporting material and a binder resin. The charge transport layer may be a layer including a high-molecular charge transporting material.

Examples of the charge transporting material include, but are not limited to, the following electron transporting compounds: quinones, such as p-benzoquinone, chloranil, bromanil, and anthraquinone; tetracyanoquinodimethane compounds; fluorenones, such as 2,4,7-trinitrofluorenone; xanthones; benzophenones; cyanovinyl compounds; and ethylenes. Examples of the charge transporting material further include hole transporting compounds, such as triarylamines, benzidines, arylalkanes, aryl-substituted ethylenes, stilbenes, anthracenes, and hydrazones. The above charge transporting materials may be used alone or in combination of two or more.

The charge transporting material may be selected from the following compounds in consideration of charge mobility: the triarylamine charge transporting material represented by General Formula (a-1) below (hereinafter, referred to as "triarylamine charge transporting material (a-1)"); the charge transporting material represented by General Formula (CT1) below (hereinafter, referred to as "butadiene charge transporting material (CT1)); and the charge transporting material represented by General Formula (CT2) below (hereinafter, referred to as "benzidine charge transporting material (CT2)"), which are examples of the triarylamine charge transporting material.

The butadiene charge transporting material (CT1) and the benzidine charge transporting material (CT2) may be used in combination with each other as a charge transporting material.

The triarylamine charge transporting material (a-1) is described below.

The triarylamine charge transporting material (a-1) is the charge transporting material represented by General Formula (a-1) below.

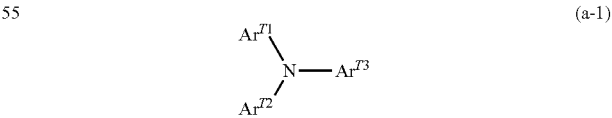

(a-1)

In General Formula (a-1), $Ar^{T1}$, $Ar^{T2}$, and $Ar^{T3}$ each independently represent an aryl group, a substituted aryl group, a $-C_6H_4-C(R^{T4})=C(R^{T5})(R^{T6})$ group, or a $-C_6H_4-CH=CH-CH=C(R^{T7})(R^{T8})$ group, where $R^{T4}$, $R^{T5}$, $R^{T6}$, $R^{T7}$, and $R^{T8}$ each independently represent a hydrogen atom, an alkyl group, a substituted alkyl group, an aryl group, or a substituted aryl group.

Examples of a substituent group included in the above substituted groups include a halogen atom, an alkyl group having 1 to 5 carbon atoms, an alkoxy group having 1 to 5 carbon atoms, and an amino group substituted with an alkyl group having 1 to 3 carbon atoms.

The butadiene charge transporting material (CT1) is described below.

The butadiene charge transporting material (CT1) is the charge transporting material represented by General Formula (CT1) below.

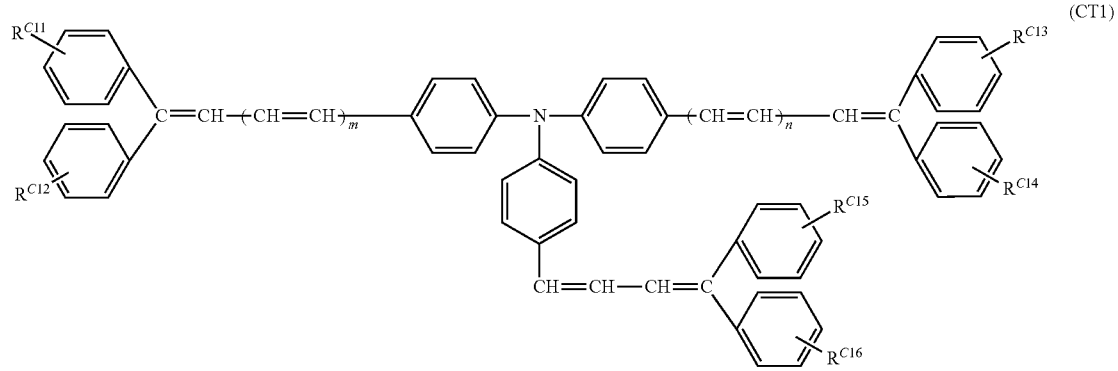

In General Formula (CT1), $R^{C11}$, $R^{C12}$, $R^{C13}$, $R^{C14}$, $R^{C15}$, and $R^{C16}$ each independently represent a hydrogen atom, a halogen atom, an alkyl group having 1 to 20 carbon atoms, an alkoxy group having 1 to 20 carbon atoms, or an aryl group having 6 to 30 carbon atoms; a pair of adjacent substituent groups may be bonded to each other to form a hydrocarbon ring structure; and n and m each independently represent 0, 1, or 2.

Examples of the halogen atom represented by $R^{C11}$, $R^{C12}$, $R^{C13}$, $R^{C14}$, $R^{C15}$, and $R^{C16}$ in General Formula (CT1) include a fluorine atom, a chlorine atom, a bromine atom, and an iodine atom. Among the above halogen atoms, a fluorine atom and a chlorine atom are preferable, and a chlorine atom is more preferable.

Examples of the alkyl group represented by $R^{C11}$, $R^{C12}$, $R^{C13}$, $R^{C14}$, $R^{C15}$, and $R^{C16}$ in General Formula (CT1) include linear and branched alkyl groups having 1 to 20 carbon atoms, preferably 1 to 6 carbon atoms, and more preferably 1 to 4 carbon atoms.

Specific examples of the linear alkyl group include a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group, and an n-icosyl group.

Specific examples of the branched alkyl group include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, a tert-decyl group, an isoundecyl group, a sec-undecyl group, a tert-undecyl group, a neoundecyl group, an isododecyl group, a sec-dodecyl group, a tert-dodecyl group, a neododecyl group, an isotridecyl group, a sec-tridecyl group, a tert-tridecyl group, a neotridecyl group, an isotetradecyl group, a sec-tetradecyl group, a tert-tetradecyl group, a neotetradecyl group, a 1-isobutyl-4-ethyloctyl group, an isopentadecyl group, a sec-pentadecyl group, a tert-pentadecyl group, a neopentadecyl group, an isohexadecyl group, a sec-hexadecyl group, a tert-hexadecyl group, a neohexadecyl group, a 1-methylpentadecyl group, an isoheptadecyl group, a sec-heptadecyl group, a tert-heptadecyl group, a neoheptadecyl group, an isooctadecyl group, a sec-octadecyl group, a tert-octadecyl group, a neooctadecyl group, an isononadecyl group, a sec-nonadecyl group, a tert-nonadecyl group, a neononadecyl group, a 1-methyloctyl group, an isoicosyl group, a sec-icosyl group, a tert-icosyl group, and a neoicosyl group.

Among the above alkyl groups, in particular, lower alkyl groups, such as a methyl group, an ethyl group, and an isopropyl group, may be used.

Examples of the alkoxy group represented by $R^{C11}$, $R^{C12}$, $R^{C13}$, $R^{C14}$, $R^{C15}$, and $R^{C16}$ in General Formula (CT1) include linear and branched alkoxy groups having 1 to 20 carbon atoms, preferably 1 to 6 carbon atoms, and more preferably 1 to 4 carbon atoms.

Specific examples of the linear alkoxy group include a methoxy group, an ethoxy group, an n-propoxy group, an n-butoxy group, an n-pentyloxy group, an n-hexyloxy group, an n-heptyloxy group, an n-octyloxy group, an n-nonyloxy group, an n-decyloxy group, an n-undecyloxy group, an n-dodecyloxy group, an n-tridecyloxy group, an n-tetradecyloxy group, an n-pentadecyloxy group, an n-hexadecyloxy group, an n-heptadecyloxy group, an n-octadecyloxy group, an n-nonadecyloxy group, and an n-icosyloxy group.

Specific examples of the branched alkoxy group include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, a tert-hexyloxy group, an isoheptyloxy group, a sec-heptyloxy group, a tert-heptyloxy group, an isooctyloxy group, a sec-octyloxy group, a tert-octyloxy group, an isononyloxy group, a sec-nonyloxy group, a tert-nonyloxy group, an isodecyloxy group, a sec-decyloxy group, a tert-decyloxy group, an isoundecyloxy group, a sec-undecyloxy group, a tert-undecyloxy group, a neoundecyloxy group, an isododecyloxy group, a sec-dodecyloxy group, a tert-dodecyloxy group, a neododecyloxy group, an isotridecyloxy group, a sec-tridecyloxy group, a tert-tridecyloxy group, a neotridecyloxy group, an isotetradecyloxy group, a sec-tetradecyloxy group, a tert-tetradecyloxy group, a neotetradecyloxy group, a 1-isobutyl- 4-ethyloctyloxy group, an isopentadecyloxy group, a sec-pentadecyloxy group, a tert-pentadecyloxy group, a neopentadecyloxy group, an isohexadecyloxy group, a sec-hexadecyloxy group, a tert-hexadecyloxy group, a neohexadecyloxy group, a 1-methylpentadecyloxy group, an isoheptadecyloxy group, a sec-heptadecyloxy group, a tert-heptadecyloxy group, a neoheptadecyloxy group, an isooctadecyloxy group, a sec-octadecyloxy group, a tert-octadecyloxy group, a neooctadecyloxy group, an isononadecyloxy group, a sec-nonadecyloxy group, a tert-nonadecyloxy group, a neononadecyloxy group, a 1-methyloctyloxy group, an isoicosyloxy group, a sec-icosyloxy group, a tert-icosyloxy group, and a neoicosyloxy group.

Among the above alkoxy groups, in particular, a methoxy group may be used.

Examples of the aryl group represented by $R^{C11}$, $R^{C12}$, $R^{C13}$, $R^{C14}$, $R^{C15}$, and $R^{C16}$ in General Formula (CT1) include aryl groups having 6 to 30 carbon atoms, preferably 6 to 20 carbon atoms, and more preferably 6 to 16 carbon atoms.

Specific examples of such aryl groups include a phenyl group, a naphthyl group, a phenanthryl group, and a biphenylyl group.

Among the above aryl groups, in particular, a phenyl group and a naphthyl group may be used.

The substituent groups represented by $R^{C11}$, $R^{C12}$, $R^{C13}$, $R^{C14}$, $R^{C15}$, and $R^{C16}$ in General Formula (CT1) may further include a substituent. Examples of the substituent include the atoms and groups described above as examples, such as a halogen atom, an alkyl group, an alkoxy group, and an aryl group.

Examples of a group with which a pair of adjacent substituent groups selected from $R^{C11}$, $R^{C12}$, $R^{C13}$, $R^{C14}$, $R^{C15}$, and $R^{C16}$ in General Formula (CT1), that is, for example, the pair of $R^{C11}$ and $R^{C12}$, the pair of $R^{C13}$ and $R^{C14}$, or the pair of $R^{C15}$ and $R^{C16}$, are bonded to each other to form a hydrocarbon ring structure include a single bond, a 2,2'-methylene group, a 2,2'-ethylene group, and a 2,2'-vinylene group. In particular, a single bond and a 2,2'-methylene group may be used.

Specific examples of the hydrocarbon ring structure include a cycloalkane structure, a cycloalkene structure, and a cycloalkane polyene structure.

In General Formula (CT1), n and m may be 1.

It is preferable that, in General Formula (CT1), $R^{C11}$, $R^{C12}$, $R^{C13}$, $R^{C14}$, $R^{C15}$, and $R^{C16}$ represent a hydrogen atom, an alkyl group having 1 to 20 carbon atoms, or an alkoxy group having 1 to 20 carbon atoms and that m and n represent 1 or 2 in order to form a photosensitive layer having high charge transporting ability, that is, a charge transport layer. It is more preferable that $R^{C11}$, $R^{C12}$, $R^{C13}$, $R^{C14}$, $R^{C15}$, and $R^{C16}$ represent a hydrogen atom and that m and n represent 1.

In other words, it is more preferable that the butadiene charge transporting material (CT1) be the charge transporting material represented by Structural Formula (CT1A) below, which is the exemplified compound (CT1-3).

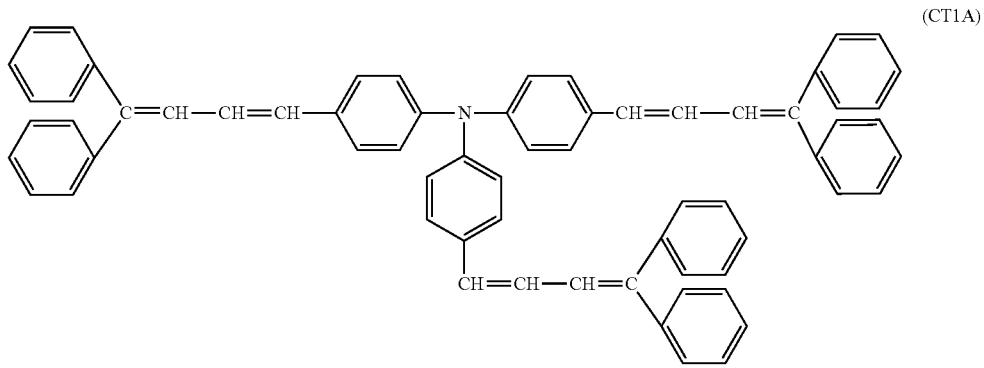 [SMILES: C(=Cc1ccc(N(c2ccc(C=CC=C(c3ccccc3)c3ccccc3)cc2)c2ccc(C=CC=C(c3ccccc3)c3ccccc3)cc2)cc1)C=C(c1ccccc1)c1ccccc1]

(CT1A)

Specific examples of the butadiene charge transporting material (CT1) include, but are not limited to, the following compounds.

| Exemplified compound No. | m | n | $R^{C11}$ | $R^{C12}$ | $R^{C13}$ | $R^{C14}$ | $R^{C15}$ | $R^{C16}$ |
|---|---|---|---|---|---|---|---|---|
| CT1-1 | 1 | 1 | 4-CH₃ | 4-CH₃ | 4-CH₃ | 4-CH₃ | H | H |
| CT1-2 | 2 | 2 | H | H | H | H | 4-CH₃ | 4-CH₃ |
| CT1-3 | 1 | 1 | H | H | H | H | H | H |
| CT1-4 | 2 | 2 | H | H | H | H | H | H |
| CT1-5 | 1 | 1 | 4-CH₃ | 4-CH₃ | 4-CH₃ | H | H | H |
| CT1-6 | 0 | 1 | H | H | H | H | H | H |
| CT1-7 | 0 | 1 | 4-CH₃ | 4-CH₃ | 4-CH₃ | 4-CH₃ | 4-CH₃ | 4-CH₃ |
| CT1-8 | 0 | 1 | 4-CH₃ | 4-CH₃ | H | H | 4-CH₃ | 4-CH₃ |
| CT1-9 | 0 | 1 | H | H | 4-CH₃ | 4-CH₃ | H | H |
| CT1-10 | 0 | 1 | H | H | 3-CH₃ | 3-CH₃ | H | H |
| CT1-11 | 0 | 1 | 4-CH₃ | H | H | H | 4-CH₃ | H |
| CT1-12 | 0 | 1 | 4-OCH₃ | H | H | H | 4-OCH₃ | H |
| CT1-13 | 0 | 1 | H | H | 4-OCH₃ | 4-OCH₃ | H | H |
| CT1-14 | 0 | 1 | 4-OCH₃ | H | 4-OCH₃ | H | 4-OCH₃ | 4-OCH₃ |

-continued

| Exemplified compound No. | m | n | $R^{C11}$ | $R^{C12}$ | $R^{C13}$ | $R^{C14}$ | $R^{C15}$ | $R^{C16}$ |
|---|---|---|---|---|---|---|---|---|
| CT1-15 | 0 | 1 | 3-CH$_3$ | H | 3-CH$_3$ | H | 3-CH$_3$ | H |
| CT1-16 | 1 | 1 | 4-CH$_3$ | 4-CH$_3$ | 4-CH$_3$ | 4-CH$_3$ | 4-CH$_3$ | 4-CH$_3$ |
| CT1-17 | 1 | 1 | 4-CH$_3$ | 4-CH$_3$ | H | H | 4-CH$_3$ | 4-CH$_3$ |
| CT1-18 | 1 | 1 | H | H | 4-CH$_3$ | 4-CH$_3$ | H | H |
| CT1-19 | 1 | 1 | H | H | 3-CH$_3$ | 3-CH$_3$ | H | H |
| CT1-20 | 1 | 1 | 4-CH$_3$ | H | H | H | 4-CH$_3$ | H |
| CT1-21 | 1 | 1 | 4-OCH$_3$ | H | H | H | 4-OCH$_3$ | H |
| CT1-22 | 1 | 1 | H | H | 4-OCH$_3$ | 4-OCH$_3$ | H | H |
| CT1-23 | 1 | 1 | 4-OCH$_3$ | H | 4-OCH$_3$ | H | 4-OCH$_3$ | 4-OCH$_3$ |
| CT1-24 | 1 | 1 | 3-CH$_3$ | H | 3-CH$_3$ | H | 3-CH$_3$ | H |

The abbreviations used for describing the above exemplified compounds stand for the following. The numbers attached to the substituent groups each refer to the position at which the substituent group is bonded to a benzene ring.

CH$_3$: Methyl group

OCH$_3$: Methoxy group

Only one type of the butadiene charge transporting material (CT1) may be used alone. Alternatively, two or more types of the butadiene charge transporting materials (CT1) may be used in combination.

The benzidine charge transporting material (CT2) is described below.

The benzidine charge transporting material (CT2) is the charge transporting material represented by General Formula (CT2) below.

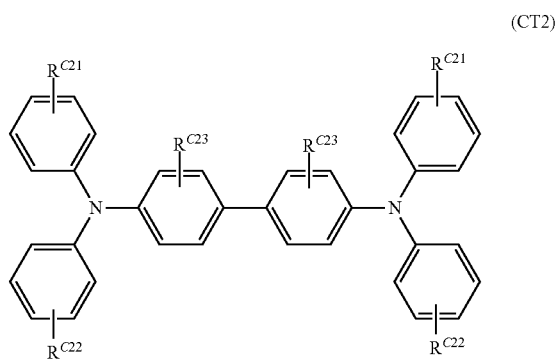

(CT2)

In General Formula (CT2), $R^{C21}$, $R^{C22}$, and $R^{C23}$ each independently represent a hydrogen atom, a halogen atom, an alkyl group having 1 to 10 carbon atoms, an alkoxy group having 1 to 10 carbon atoms, or an aryl group having 6 to 10 carbon atoms.

Examples of the halogen atom represented by $R^{C21}$, $R^{C22}$, and $R^{C23}$ in General Formula (CT2) include a fluorine atom, a chlorine atom, a bromine atom, and an iodine atom. Among the above halogen atoms, a fluorine atom and a chlorine atom are preferable, and a chlorine atom is more preferable.

Examples of the alkyl group represented by $R^{C21}$, $R^{C22}$, and $R^{C23}$ in General Formula (CT2) include linear and branched alkyl groups having 1 to 10 carbon atoms, preferably 1 to 6 carbon atoms, and more preferably 1 to 4 carbon atoms.

Specific examples of the linear alkyl group include a methyl group, an ethyl group, an n-propyl group, an n-butyl group, an n-pentyl group, an n-hexyl group, an n-heptyl group, an n-octyl group, an n-nonyl group, and an n-decyl group.

Specific examples of the branched alkyl group include an isopropyl group, an isobutyl group, a sec-butyl group, a tert-butyl group, an isopentyl group, an neopentyl group, a tert-pentyl group, an isohexyl group, a sec-hexyl group, a tert-hexyl group, an isoheptyl group, an sec-heptyl group, a tert-heptyl group, an isooctyl group, a sec-octyl group, a tert-octyl group, an isononyl group, a sec-nonyl group, a tert-nonyl group, an isodecyl group, a sec-decyl group, and a tert-decyl group.

Among the above alkyl groups, in particular, lower alkyl groups such as a methyl group, an ethyl group, and an isopropyl group may be used.

Examples of the alkoxy group represented by $R^{C21}$, $R^{C22}$ and $R^{C23}$ in General Formula (CT2) include linear and branched alkoxy groups having 1 to 10 carbon atoms, preferably 1 to 6 carbon atoms, and more preferably 1 to 4 carbon atoms.

Specific examples of the linear alkoxy group include a methoxy group, an ethoxy group, an n-propoxy group, an n-butoxy group, an n-pentyloxy group, an n-hexyloxy group, an n-heptyloxy group, an n-octyloxy group, an n-nonyloxy group, and an n-decyloxy group.

Specific examples of the branched alkoxy group include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, a tert-hexyloxy group, an isoheptyloxy group, a sec-heptyloxy group, a tert-heptyloxy group, an isooctyloxy group, a sec-octyloxy group, a tert-octyloxy group, an isononyloxy group, a sec-nonyloxy group, a tert-nonyloxy group, an isodecyloxy group, a sec-decyloxy group, and a tert-decyloxy group.

Among the above alkoxy groups, in particular, a methoxy group may be used.

Examples of the aryl group represented by $R^{C21}$, $R^{C22}$, and $R^{C23}$ in General Formula (CT2) include aryl groups having 6 to 10 carbon atoms, preferably 6 to 9 carbon atoms, and more preferably 6 to 8 carbon atoms.

Specific examples of the aryl groups include a phenyl group and a naphthyl group.

Among the above aryl groups, in particular, a phenyl group may be used.

The substituent groups represented by $R^{C21}$, $R^{C22}$, and $R^{C23}$ in General Formula (CT2) may further include a substituent. Examples of the substituent include the atoms and groups described above as examples, such as a halogen atom, an alkyl group, an alkoxy group, and an aryl group.

In General Formula (CT2), it is preferable that $R^{C21}$, $R^{C22}$, and $R^{C23}$ each independently represent a hydrogen atom or an alkyl group having 1 to 10 carbon atoms. It is more preferable that $R^{C21}$ and $R^{C23}$ represent a hydrogen atom and $R^{C22}$ represent an alkyl group having 1 to 10 carbon atoms (in particular, a methyl group) in order to form a photosensitive layer (i.e., a charge transport layer) having high charge transporting ability.

Specifically, it is particularly preferable that the benzidine charge transporting material (CT2) be the charge transporting material represented by Structural Formula (CT2A) below, which is the exemplified compound (CT2-2).

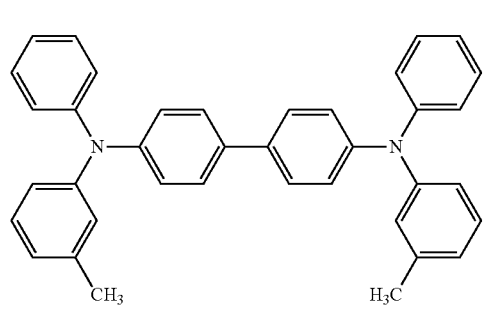

(CT2A)

Specific examples of the benzidine charge transporting material (CT2) include, but are not limited to, the following compounds.

| Exemplified compound No. | $R^{C21}$ | $R^{C22}$ | $R^{C23}$ |
| --- | --- | --- | --- |
| CT2-1 | H | H | H |
| CT2-2 | H | 3-CH$_3$ | H |
| CT2-3 | H | 4-CH$_3$ | H |
| CT2-4 | H | 3-C$_2$H$_5$ | H |
| CT2-5 | H | 4-C$_2$H$_5$ | H |
| CT2-6 | H | 3-OCH$_3$ | H |
| CT2-7 | H | 4-OCH$_3$ | H |
| CT2-8 | H | 3-OC$_2$H$_5$ | H |
| CT2-9 | H | 4-OC$_2$H$_5$ | H |
| CT2-10 | 3-CH$_3$ | 3-CH$_3$ | H |
| CT2-11 | 4-CH$_3$ | 4-CH$_3$ | H |
| CT2-12 | 3-C$_2$H$_5$ | 3-C$_2$H$_5$ | H |
| CT2-13 | 4-C$_2$H$_5$ | 4-C$_2$H$_5$ | H |
| CT2-14 | H | H | 2-CH$_3$ |
| CT2-15 | H | H | 3-CH$_3$ |
| CT2-16 | H | 3-CH$_3$ | 2-CH$_3$ |
| CT2-17 | H | 3-CH$_3$ | 3-CH$_3$ |
| CT2-18 | H | 4-CH$_3$ | 2-CH$_3$ |
| CT2-19 | H | 4-CH$_3$ | 3-CH$_3$ |
| CT2-20 | 3-CH$_3$ | 3-CH$_3$ | 2-CH$_3$ |
| CT2-21 | 3-CH$_3$ | 3-CH$_3$ | 3-CH$_3$ |
| CT2-22 | 4-CH$_3$ | 4-CH$_3$ | 2-CH$_3$ |
| CT2-23 | 4-CH$_3$ | 4-CH$_3$ | 3-CH$_3$ |

The abbreviations used for describing the above exemplified compounds stand for the following. The numbers attached to the substituent groups each refer to the position at which the substituent group is bonded to a benzene ring.

CH$_3$: Methyl group
C$_2$H$_5$: Ethyl group
OCH$_3$: Methoxy group
OC$_2$H$_5$: Ethoxy group Only one type of the benzidine charge transporting material (CT2) may be used alone. Alternatively, two or more types of the benzidine charge transporting materials (CT2) may be used in combination.

The high-molecular charge transporting material may be any known charge transporting material, such as poly-N-vinylcarbazole or polysilane. In particular, the polyester high-molecular charge transporting materials disclosed in, for example, Japanese Laid Open Patent Application Publication Nos. H8-176293 and H8-208820 may be used. The above high-molecular charge transporting materials may be used alone or in combination with the above binder resins.

Examples of the binder resin included in the charge transport layer include a polycarbonate resin, a polyester resin, a polyarylate resin, a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone alkyd resin, a phenol-formaldehyde resin, a styrene-alkyd resin, poly-N-vinylcarbazole, and polysilane. Among the above binder resins, in particular, a polycarbonate resin and a polyarylate resin may be used.

The above binder resins are used alone or in combination of two or more.

The ratio of the amounts of the charge transporting material and the binder resin included in the charge transport layer may be 10:1 to 1:5 by mass.

The charge transport layer may optionally include known additives.

The method for forming the charge transport layer is not limited, and any known method may be employed. The charge transport layer may be formed by, for example, forming a coating film using a coating liquid prepared by mixing the above-described components with a solvent (hereinafter, this coating liquid is referred to as "charge transport layer forming coating liquid"), drying the coating film, and, as needed, heating the coating film.

Examples of the solvent used for preparing the charge transport layer forming coating liquid include the following common organic solvents: aromatic hydrocarbons, such as benzene, toluene, xylene, and chlorobenzene; ketones, such as acetone and 2-butanone; halogenated aliphatic hydrocarbons, such as methylene chloride, chloroform, and ethylene chloride; and cyclic and linear ethers, such as tetrahydrofuran and ethyl ether. The above solvents may be used alone or in a mixture of two or more.

For applying the charge transport layer forming coating liquid onto the surface of the charge generation layer, for example, the following common coating methods may be used: blade coating, wire bar coating, spray coating, dip coating, bead coating, air knife coating, and curtain coating.

The thickness of the charge transport layer is, for example, preferably 5 μm or more and 50 μm or less, is more preferably 10 μm or more and 45 μm or less, and is further preferably 20 μm or more and 42 μm or less.

Protection Layer

A protection layer may optionally be disposed on the photosensitive layer. The protection layer is provided in order to, for example, reduce the chemical change of the photosensitive layer which may occur during charging and increase the mechanical strength of the photosensitive layer.

Therefore, the protection layer may be a layer composed of a cured film (i.e., a crosslinked film). Examples of such a layer include the layers described in 1) and 2) below.

1) a layer composed of a film formed by curing a composition including a reactive group-containing charge transporting material that includes a reactive group and a charge transporting skeleton in the same molecule, that is, a layer including a polymer or a crosslinked product of the reactive group-containing charge transporting material.

2) a layer composed of a film formed by curing a composition including a nonreactive charge transporting material and a reactive group-containing non-charge transporting material that does not include a charge transporting skeleton and includes a reactive group, that is, a layer including a polymer or a crosslinked product of the nonreactive charge transporting material with the reactive group-containing non-charge transporting material.

Examples of the reactive group included in the reactive group-containing charge transporting material include the following known reactive groups: a chain-polymerization group; an epoxy group; a —OH group; a —OR group, where R is an alkyl group; a —NH$_2$ group; a —SH group; a —COOH group; and a —SiR$^{Q1}_{3-Qn}$(OR$^{Q2}$)$_{Qn}$ group, where R$^{Q1}$ represents a hydrogen atom, an alkyl group, an aryl group, or a substituted aryl group, R$^{Q2}$ represents a hydrogen atom, an alkyl group, or a trialkylsilyl group, and Qn is an integer of 1 to 3.

The chain-polymerization group is not limited, and may be any functional group capable of inducing radical polymerization. Examples of the chain-polymerization group include functional groups including at least a carbon double bond. Specific examples of the chain-polymerization group include functional groups including at least one selected from a vinyl group, a vinyl ether group, a vinylthioether group, a vinylphenyl group, an acryloyl group, a methacryloyl group, and derivatives of the above groups. In particular, a chain-polymerization group including at least one selected from a vinyl group, a vinylphenyl group, an acryloyl group, a methacryloyl group, and derivatives of the above groups may be used, because such a chain-polymerization group has high reactivity.

The charge transporting skeleton of the reactive group-containing charge transporting material is not limited and may be any charge transporting skeleton having a structure known in the field of electrophotographic photosensitive members. Examples of such a charge transporting skeleton include skeletons that are derived from nitrogen-containing hole transporting compounds, such as triarylamines, benzidines, and hydrazones and conjugated with a nitrogen atom. Among such skeletons, in particular, a triarylamine skeleton may be used.

The above-described reactive group-containing charge transporting material that includes the reactive group and the charge transporting skeleton, the nonreactive charge transporting material, and the reactive group-containing non-charge transporting material may be selected from known materials.

The protection layer may optionally include known additives.

The method for forming the protection layer is not limited, and known methods may be used. The protection layer may be formed by, for example, forming a coating film using a coating liquid prepared by mixing the above-described components in a solvent (hereinafter, this coating liquid is referred to as "protection layer forming coating liquid"), drying the coating film, and, as needed, curing the coating film by heating or the like.

Examples of the solvent used for preparing the protection layer forming coating liquid include aromatic solvents, such as toluene and xylene; ketone solvents, such as methyl ethyl ketone, methyl isobutyl ketone, and cyclohexanone; ester solvents, such as ethyl acetate and butyl acetate; ether solvents, such as tetrahydrofuran and dioxane; cellosolve solvents, such as ethylene glycol monomethyl ether; and alcohol solvents, such as isopropyl alcohol and butanol. The above solvents may be used alone or in a mixture of two or more.

The protection layer forming coating liquid may be prepared without using a solvent.

For applying the protection layer forming coating liquid on the photosensitive layer (e.g., the charge transport layer), for example, the following common methods may be used: dip coating, push coating, wire bar coating, spray coating, blade coating, knife coating, and curtain coating.

The thickness of the protection layer is preferably, for example, 1 μm or more and 20 μm or less and is more preferably 2 μm or more and 10 μm or less.

Image Forming Apparatus and Process Cartridge

An image forming apparatus according to this exemplary embodiment includes an electrophotographic photosensitive member; a charging unit that charges the surface of the electrophotographic photosensitive member; a unit that forms an electrostatic latent image on the charged surface of the electrophotographic photosensitive member (hereinafter, this unit is referred to as "electrostatic latent image forming unit"); a developing unit that develops the electrostatic latent image formed on the surface of the electrophotographic photosensitive member with a developer including a toner in order to form a toner image; and a transfer unit that transfers the toner image onto the surface of a recording medium. The electrophotographic photosensitive member is the electrophotographic photosensitive member according to the above-described exemplary embodiment.

The image forming apparatus according to this exemplary embodiment may be implemented as any of the following known image forming apparatuses: an image forming apparatus that includes a fixing unit that fixes the toner image transferred on the surface of the recording medium; a direct-transfer image forming apparatus that directly transfers a toner image formed on the surface of the electrophotographic photosensitive member onto the surface of a recording medium; an intermediate-transfer image forming apparatus that transfers a toner image formed on the surface of the electrophotographic photosensitive member onto the surface of an intermediate transfer body (this process is referred to as "first transfer") and further transfers the toner image transferred on the surface of the intermediate transfer body onto the surface of a recording medium (this process is referred to as "second transfer"); an image forming apparatus that includes a cleaning unit that cleans the surface of the electrophotographic photosensitive member after the toner image has been transferred and before the electrophotographic photosensitive member is charged; an image forming apparatus that includes an erasing unit that irradiates, with erasing light, the surface of the electrophotographic photosensitive member after the toner image has been transferred and before the electrophotographic photosensitive member is charged in order to erase charge; and an image forming apparatus that includes an electrophotographic photosensitive member heating member that heats the electrophotographic photosensitive member in order to lower the relative temperature.

In the intermediate-transfer image forming apparatus, the transfer unit includes, for example, an intermediate transfer body onto which a toner image is transferred, a first transfer unit that transfers a toner image formed on the surface of the electrophotographic photosensitive member onto the surface of the intermediate transfer body (first transfer), and a second transfer unit that transfers the toner image transferred on the surface of the intermediate transfer body onto the surface of a recording medium (second transfer).

The image forming apparatus according to this exemplary embodiment may be either a dry-developing image forming apparatus or a wet-developing image forming apparatus in which a liquid developer is used for developing images.

In the image forming apparatus according to this exemplary embodiment, for example, a portion including the electrophotographic photosensitive member may have a cartridge structure, that is, may be a process cartridge, which is detachably attachable to the image forming apparatus. The process cartridge may include, for example, the electrophotographic photosensitive member according to the above-described exemplary embodiment. The process cartridge may further include, for example, at least one component selected from the group consisting of the charging unit, the electrostatic latent image forming unit, the developing unit, and the transfer unit.

An example of the image forming apparatus according to this exemplary embodiment is described below. However, the image forming apparatus is not limited to this. Hereinafter, only the components illustrated in the drawings are described, and the descriptions of the other components are omitted.

Figure 2:
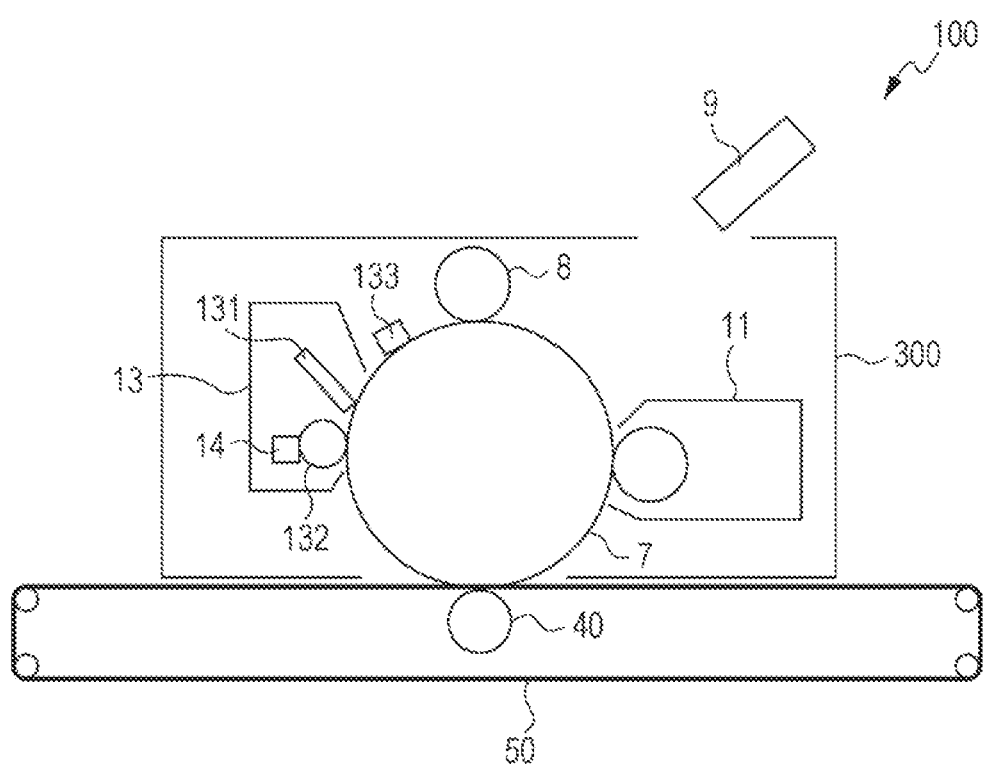
FIG. 2 is a schematic diagram illustrating an example of an image forming apparatus according to an exemplary embodiment.

FIG. 2 schematically illustrates an example of the image forming apparatus according to this exemplary embodiment.

As illustrated in FIG. 2, an image forming apparatus 100 according to this exemplary embodiment includes a process cartridge 300 including an electrophotographic photosensitive member 7, an exposure device 9 (an example of the electrostatic latent image forming unit), a transfer device 40 (i.e., a first transfer device), and an intermediate transfer body 50. In the image forming apparatus 100, the exposure device 9 is arranged such that the electrophotographic photosensitive member 7 is exposed to light emitted by the exposure device 9 through an aperture formed in the process cartridge 300; the transfer device 40 is arranged to face the electrophotographic photosensitive member 7 across the intermediate transfer body 50; and the intermediate transfer body 50 is arranged such that a part of the intermediate transfer body 50 comes into contact with the electrophotographic photosensitive member 7. Although not illustrated in FIG. 2, the image forming apparatus 100 also includes a second transfer device that transfers a toner image transferred on the intermediate transfer body 50 onto a recording medium, such as paper. The intermediate transfer body 50, the transfer device 40 (i.e., a first transfer device), and the second transfer device (not illustrated) correspond to an example of the transfer unit.

The process cartridge 300 illustrated in FIG. 2 includes the electrophotographic photosensitive member 7, a charging device 8 (an example of the charging unit), a developing device 11 (an example of the developing unit), and a cleaning device 13 (an example of the cleaning unit), which are integrally supported inside a housing. The cleaning device 13 includes a cleaning blade 131 (an example of the cleaning member), which is arranged to come into contact with the surface of the electrophotographic photosensitive member 7. The cleaning member is not limited to the cleaning blade 131 and may be a conductive or insulative fibrous member. The conductive or insulative fibrous member may be used alone or in combination with the cleaning blade 131.

The image forming apparatus illustrated in FIG. 2 includes a roller-like, fibrous member 132 with which a lubricant 14 is fed onto the surface of the electrophotographic photosensitive member 7 and a flat-brush-like, fibrous member 133 that assists cleaning. However, the image forming apparatus illustrated in FIG. 2 is merely an example, and the fibrous members 132 and 133 are optional.

The components of the image forming apparatus according to this exemplary embodiment are described below.

Charging Device

Examples of the charging device 8 include contact chargers that include a charging roller, a charging brush, a charging film, a charging rubber blade, or a charging tube that are conductive or semiconductive; contactless roller chargers; and known chargers such as a scorotron charger and a corotron charger that use corona discharge.

Exposure Device

The exposure device 9 may be, for example, an optical device with which the surface of the electrophotographic photosensitive member 7 can be exposed to light emitted by a semiconductor laser, an LED, a liquid-crystal shutter, or the like in a predetermined image pattern. The wavelength of the light source is set to fall within the range of the spectral sensitivity of the electrophotographic photosensitive member. Although common semiconductor lasers have an oscillation wavelength in the vicinity of 780 nm, that is, the near-infrared region, the wavelength of the light source is not limited to this; lasers having an oscillation wavelength of about 600 to 700 nm and blue lasers having an oscillation wavelength of 400 nm or more and 450 nm or less may also be used. For forming color images, surface-emitting lasers capable of emitting multi beam may be used as a light source.

Developing Device

The developing device 11 may be, for example, a common developing device that develops latent images with a developer in a contacting or noncontacting manner. The developing device 11 is not limited and may be selected from developing devices having the above functions in accordance with the purpose. Examples of the developing device include known developing devices capable of depositing a one- or two-component developer on the electrophotographic photosensitive member 7 with a brush, a roller, or the like. In particular, a developing device including a developing roller on which a developer is deposited may be used.

The developer included in the developing device 11 may be either a one-component developer including only a toner or a two-component developer including a toner and a carrier. The developer may be magnetic or nonmagnetic. Known developers may be used as a developer included in the developing device 11.

Cleaning Device

The cleaning device 13 is a cleaning-blade-type cleaning device including a cleaning blade 131.

The cleaning device 13 is not limited to a cleaning-blade-type cleaning device and may be a fur-brush-cleaning-type cleaning device or a cleaning device that performs cleaning during development.

Transfer Device

Examples of the transfer device 40 include contact transfer chargers including a belt, a roller, a film, a rubber blade, or the like; and known transfer chargers which use corona discharge, such as a scorotron transfer charger and a corotron transfer charger.

Intermediate Transfer Body

The intermediate transfer body 50 is a belt-like intermediate transfer body, that is, an intermediate transfer belt, including polyimide, polyamideimide, polycarbonate, polyarylate, polyester, a rubber, or the like that is made semiconductive. The intermediate transfer body is not limited to a belt-like intermediate transfer body and may be a drum-like intermediate transfer body.

Figure 3:
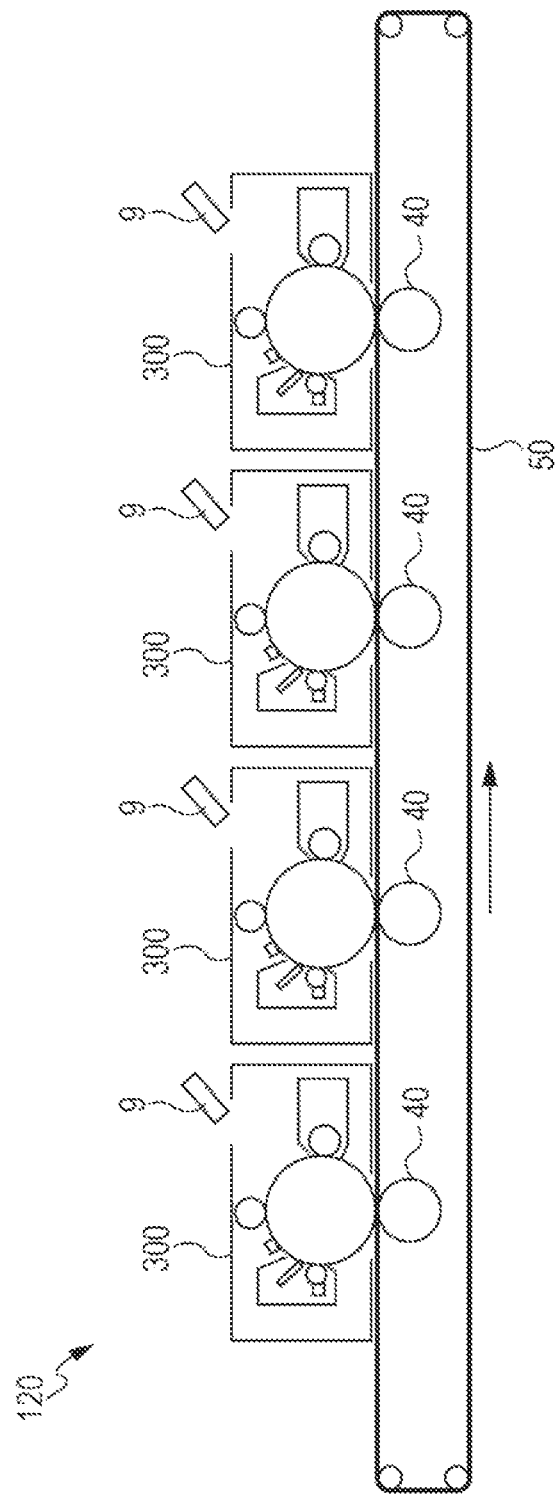
FIG. 3 is a schematic diagram illustrating another example of the image forming apparatus according to the exemplary embodiment.

FIG. 3 schematically illustrates another example of the image forming apparatus according to this exemplary embodiment.

The image forming apparatus 120 illustrated in FIG. 3 is a tandem, multi-color image forming apparatus including four process cartridges 300. In the image forming apparatus 120, the four process cartridges 300 are arranged in parallel to one another on an intermediate transfer body 50, and one electrophotographic photosensitive member is used for one color. The image forming apparatus 120 has the same structure as the image forming apparatus 100 except that the image forming apparatus 120 is tandem.

EXAMPLES

The exemplary embodiments are described in detail below with reference to Examples. The exemplary embodiments are not limited by Examples below. In the following description, all "part" and "%" are on a mass basis unless otherwise specified.

Example 1

With 100 parts by mass of zinc oxide "MZ 300" produced by TAYCA CORPORATION, 10 parts by mass of a 10-mass % toluene solution of N-2-(aminoethyl)-3-aminopropyltri-ethoxysilane, which serves as a silane coupling agent, and 200 parts by mass of toluene are mixed. The resulting mixture is stirred and then refluxed for two hours. The toluene is distilled off under reduced pressure (10 mmHg). Subsequently, a burn-in treatment is performed at 135° C. for 2 hours to perform a surface treatment.

With 33 parts by mass of the surface-treated zinc oxide, 6 parts by mass of blocked isocyanate "Sumidur 3175" produced by Sumitomo Bayer Urethane Co., Ltd., 1 part by mass of the compound represented by Structural Formula (AK-1) below, which serves as an electron accepting compound, and 25 parts by mass of methyl ethyl ketone are mixed for 30 minutes. To the resulting mixture, 5 parts by mass of a butyral resin "S-LEC BM-1" produced by SEKISUI CHEMICAL CO., LTD., 3 parts by mass of silicone beads "Tospearl 120" produced by Momentive Performance Materials Inc., and 0.01 parts by mass of a silicone oil "SH29PA" produced by Dow Corning Toray Silicone Co., Ltd., which serves as a leveling agent, are added. The mixture is dispersed for 3 hours with a sand mill to form an undercoat layer forming coating liquid.

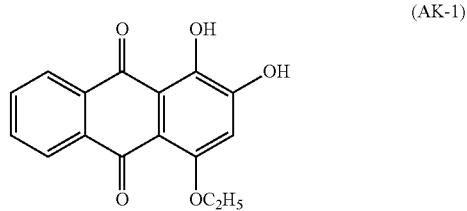 [SMILES: CCOc1cc(O)c(O)c2c1C(=O)c1ccccc1C2=O]

(AK-1)

The undercoat layer forming coating liquid is applied to an aluminum support having a diameter of 30 mm, a length of 365 mm, and a thickness of 1 mm by dip coating. The resulting coating film is cured by drying at 180° C. for 30 minutes to form an undercoat layer having a thickness of 25 μm.

A mixture of a hydroxygallium phthalocyanine pigment (HOGaPc) used as a charge generating material, the specific copolymer (1) below used as a binder resin, and acetone is charged into a glass bottle having a volume of 100 mL together with glass beads having a diameter of 1.0 mm (filling ratio: 50%). The mixture is dispersed for 2.5 hours with a paint shaker to form a charge generation layer forming coating liquid.

Specific copolymer (1): a vinyl copolymer that includes, as a chlorine-containing component, the structural unit represented by General Formula (1) above in which all of $R^{11}$ to $R^{13}$ represent a hydrogen atom; as an acyloxy component, the structural unit represented by General Formula (2) above in which all of $R^{21}$ to $R^{23}$ represent a hydrogen atom and $R^{24}$ represents a methyl group; and, as an aromatic polycarboxylic acid component, a structural unit having a phthalic acid structure that does not include any other substituent groups, the benzene ring of the phthalic acid structure being bonded directly to the backbone. The proportions of the above components are as described in Table 1.

Table 1 lists the weight average molecular weight and THF solubility of the specific copolymer (1).

The amount of hydroxygallium phthalocyanine pigment included in the charge generation layer forming coating liquid is set to 60% by mass of the total amount of hydroxygallium phthalocyanine pigment and the specific copolymer (1) included in the coating liquid. The concentration of the solid component in the charge generation layer forming coating liquid is set to 6.0% by mass.

The hydroxygallium phthalocyanine pigment used is a Type-V hydroxygallium phthalocyanine pigment having a diffraction peak at, at least, Bragg angles (2θ±0.2°) of 7.3°, 16.0°, 24.9°, and 28.0° in an X-ray diffraction spectrum measured with the CuKα radiation. The hydroxygallium phthalocyanine pigment has a maximum peak wavelength at 820 nm in an absorption spectrum that covers a wavelength range of 600 nm or more and 900 nm or less, an average particle diameter of 0.12 μm, a maximum particle diameter of 0.2 μm, and a specific surface area of 60 m$^2$/g.

The charge generation layer forming coating liquid is applied to the undercoat layer by dip coating. The resulting coating film is cured by drying at 150° C. for 5 minutes to form a charge generation layer having a thickness of 0.14 μm.

Subsequently, 12 parts by mass of the charge transporting material represented by Structural Formula (CT1A) below, 28 parts by mass of the charge transporting material represented by Structural Formula (CT2A) below, and 60 parts by mass of a bisphenol Z polycarbonate resin (molecular weight: 40,000) are dissolved in 340 parts by mass of tetrahydrofuran to form a charge transport layer forming coating liquid.

The charge transport layer forming coating liquid is applied to the charge generation layer by dip coating. The resulting coating film is cured by drying at 150° C. for 40 minutes to form a charge transport layer having a thickness of 40 μm.

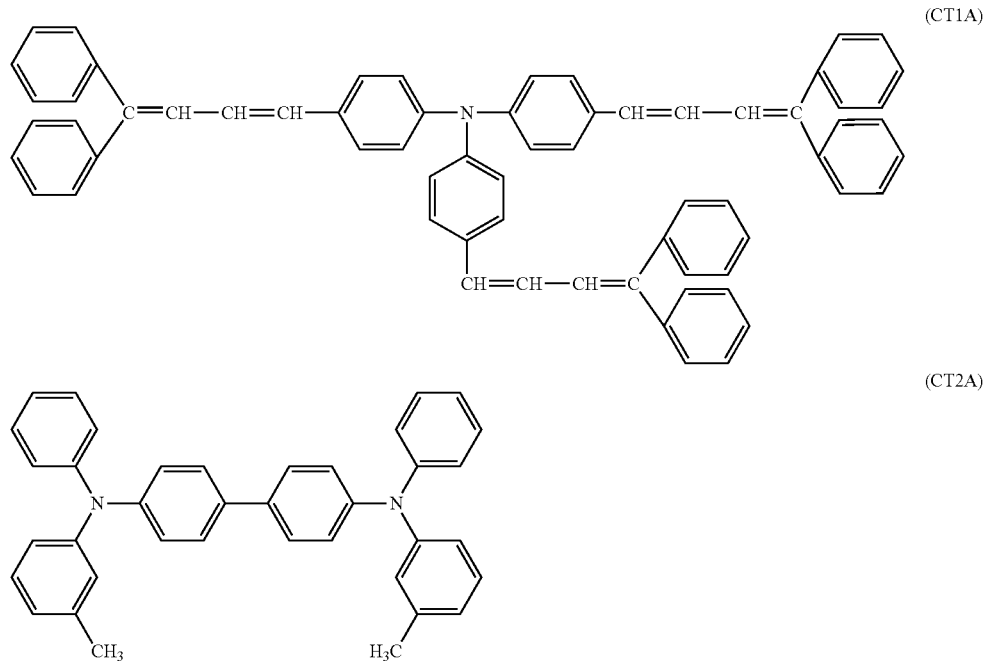

The electrophotographic photosensitive member of Example 1 is prepared by the above process.

Examples 2 to 7

An electrophotographic photosensitive member is prepared as in Example 1, except that a specific one of the specific copolymers (2) to (7), which are prepared by changing the proportions of the structural units constituting the specific copolymer (1) as described in Table 1, is used as a binder resin in the preparation of the charge generation layer forming coating liquid.

Table 1 lists the weight average molecular weight and THF solubility of each of the specific copolymers (2) to (7).

Examples 8 to 14

Electrophotographic photosensitive members of Examples 8 to 14 are prepared as in Examples 1 to 7, respectively, except that the type of the charge generating material used for preparing the charge generation layer forming coating liquid is changed to a chlorogallium phthalocyanine pigment (ClGaPc).

Examples 15 to 21

Electrophotographic photosensitive members of Examples 15 to 21 are prepared as in Examples 1 to 7, respectively, except that the type of the charge generating material used for preparing the charge generation layer forming coating liquid is changed to a titanyl phthalocyanine pigment (TiOPc).

Comparative Example 1

An electrophotographic photosensitive member is prepared as in Example 1, except that the vinyl copolymer (C1) below is used as a binder resin in the preparation of the charge generation layer forming coating liquid.

Vinyl copolymer (C1): a vinyl copolymer that includes, as a chlorine-containing component, the structural unit represented by General Formula (1) above in which all of $R^{11}$ to $R^{13}$ represent a hydrogen atom; as an acyloxy component, the structural unit represented by General Formula (2) above in which all of $R^{21}$ to $R^{23}$ represent a hydrogen atom and $R^{24}$ represents a methyl group; and, as another polycarboxylic acid component, a component derived from maleic acid. The proportions of the above components are as described in Table 1.

Table 1 lists the weight average molecular weight and THF solubility of the vinyl copolymer (C1).

Comparative Examples 2 to 7

An electrophotographic photosensitive member is prepared as in Comparative Example 1, except that a specific one of the vinyl copolymers (C2) to (C7), which are prepared by changing the proportions of the structural units constituting the vinyl copolymer (C1) as described in Table 1, is used as a binder resin in the preparation of the charge generation layer forming coating liquid.

Table 1 lists the weight average molecular weight and THF solubility of each of the vinyl copolymers (C2) to (C7).

Comparative Examples 8 and 9

An electrophotographic photosensitive member is prepared as in Example 1, except that a specific one of the specific copolymers (8) and (9), which are prepared by changing the proportions of the structural units constituting the specific copolymer (1) as described in Table 1, is used as a binder resin in the preparation of the charge generation layer forming coating liquid.

Table 1 lists the weight average molecular weight and THF solubility of each of the specific copolymers (8) and (9).

Comparative Example 10

An electrophotographic photosensitive member is prepared as in Example 1, except that the vinyl copolymer (C8)

below is used as a binder resin in the preparation of the charge generation layer forming coating liquid.

Vinyl copolymer (C8): a vinyl copolymer that includes, as a chlorine-containing component, the structural unit represented by General Formula (1) above in which all of $R^{11}$ to $R^{13}$ represent a hydrogen atom; as an acyloxy component, the structural unit represented by General Formula (2) above in which all of $R^{21}$ to $R^{23}$ represent a hydrogen atom and $R^{24}$ represents a methyl group; and, as another polycarboxylic acid component, a component derived from hydroxybutyl acrylate. The proportions of the above components are as described in Table 1.

Comparative Example 11

An electrophotographic photosensitive member is prepared as in Comparative Example 10, except that a vinyl copolymers (C9), which is prepared by changing the proportions of the structural units constituting the vinyl copolymer (C8) as described in Table 1, is used as a binder resin in the preparation of the charge generation layer forming coating liquid.

Table 1 lists the weight average molecular weight and THF solubility of the vinyl copolymer (C9).

Comparative Examples 12 to 18

Electrophotographic photosensitive members of Comparative Examples 12 to 18 are prepared as in Comparative Examples 1 to 7, respectively, except that the type of the charge generating material used for preparing the charge generation layer forming coating liquid is changed to a chlorogallium phthalocyanine pigment (ClGaPc).

Comparative Examples 19 to 25

Electrophotographic photosensitive members of Comparative Examples 19 to 25 are prepared as in Comparative Examples 1 to 7, respectively, except that the type of the charge generating material used for preparing the charge generation layer forming coating liquid is changed to a titanyl phthalocyanine pigment (TiOPc).

TABLE 1

|  | Chlorine-containing component Proportion [mass %] | Acyloxy component Proportion [mass %] | Polycarboxylic acid component Type | Polycarboxylic acid component Proportion [mass %] | Weight average molecular weight [×10$^4$] | THF solubility [mass part] |
| --- | --- | --- | --- | --- | --- | --- |
| Specific copolymer (1) | 85.0 | 14.0 | Phthalic acid | 1.0 | 6.9 | 7.4 |
| Specific copolymer (2) | 86.0 | 13.0 | Phthalic acid | 1.0 | 6.8 | 6.9 |
| Specific copolymer (3) | 81.0 | 18.0 | Phthalic acid | 1.0 | 6.2 | 7.8 |
| Specific copolymer (4) | 87.5 | 12.0 | Phthalic acid | 0.5 | 6.8 | 6.8 |
| Specific copolymer (5) | 86.0 | 12.0 | Phthalic acid | 2.0 | 6.6 | 7.2 |
| Specific copolymer (6) | 81.5 | 18.0 | Phthalic acid | 0.5 | 6.7 | 7.6 |
| Specific copolymer (7) | 80.0 | 18.0 | Phthalic acid | 2.0 | 6.5 | 7.9 |
| Vinyl copolymer (C1) | 85.0 | 14.0 | Maleic acid | 1.0 | 7.2 | 10.8 |
| Vinyl copolymer (C2) | 86.0 | 13.0 | Maleic acid | 1.0 | 6.5 | 10.7 |
| Vinyl copolymer (C3) | 81.0 | 18.0 | Maleic acid | 1.0 | 6.3 | 11.5 |
| Vinyl copolymer (C4) | 87.5 | 12.0 | Maleic acid | 0.5 | 6.9 | 10.7 |
| Vinyl copolymer (C5) | 86.0 | 12.0 | Maleic acid | 2.0 | 6.8 | 10.7 |
| Vinyl copolymer (C6) | 81.5 | 18.0 | Maleic acid | 0.5 | 6.3 | 11.1 |
| Vinyl copolymer (C7) | 80.0 | 18.0 | Maleic acid | 2.0 | 6.2 | 11.3 |
| Specific copolymer (8) | 78.0 | 20.0 | Phthalic acid | 2.0 | 6.5 | 10.3 |
| Specific copolymer (9) | 77.0 | 18.0 | Phthalic acid | 5.0 | 6.6 | 10.5 |
| Vinyl copolymer (C8) | 78.0 | 20.0 | Hydroxybutyl acrylate | 2.0 | 6.7 | 13.8 |
| Vinyl copolymer (C9) | 83.0 | 4.0 | Hydroxybutyl acrylate | 13.0 | 6.4 | 13.2 |

Evaluations

Evaluation of Image Density Difference

A specific one of the electrophotographic photosensitive members prepared in Examples and Comparative Examples above is attached to an electrophotographic image forming apparatus "ApeosPort-V C7776" produced by Fuji Xerox Co., Ltd. Using this image forming apparatus, a solid halftone image (cyan solid halftone image) having an image density of 70% is formed on 1,000 A3-size paper sheets. Note that all of the images are formed at 10° C. and 15% RH.

The image density of the solid halftone image formed on the 1,000th sheet is measured with an image densitometer "X-Rite 938" produced by X-Rite, Inc. at 5 positions and the average thereof is calculated in each of the regions of the sheet which correspond to the ends of the electrophotographic photosensitive member in the axial direction. The difference in image density, that is, the absolute value of [Average image density at one of the ends]−[Average image density at the other end], is calculated and evaluated with reference to the following evaluation standards. Tables 2 and 3 list the results. The evaluation grades "G0" to "G2" are considered acceptable.

Evaluation Standards

G0: 0≤Image density difference≤0.05
G1: 0.05<Image density difference≤0.1
G2: 0.1<Image density difference≤0.2
G3: 0.2<Image density difference≤0.25
G4: 0.25<Image density difference≤0.3
G5: 0.3<Image density difference≤0.35
G6: 0.35<Image density difference Sensitivity Evaluation The sensitivity of each of the electrophotographic photosensitive members prepared in Examples and Comparative Examples above is evaluated on the basis of the half decay exposure of the electrophotographic photosensitive member which is measured when the electrophotographic photosensitive member is charged to +800 V.

Specifically, a specific one of the electrophotographic photosensitive members prepared in Examples and Comparative Examples above is charged to +800 V with an electrostatic copying paper testing apparatus "Electrostatic Analyzer EPA-8100" produced by Kawaguchi Electric Works at a temperature of 20° C. and a relative humidity of 40%. Subsequently, light emitted from a tungsten lamp is converted into monochromatic light of 800 nm with a monochromator. The electrophotographic photosensitive member is irradiated with the monochromatic light while the amount of the light emitted is adjusted such that the intensity of the light incident on the surface of the electrophotographic photosensitive member is 1 μW/cm². The amount of light emitted until the potential of the surface of the electrophotographic photosensitive member is reduced to half of the potential Vo [V] of the surface of the electrophotographic photosensitive member measured immediately after charging due to light irradiation, that is, half decay exposure, (μJ/cm²) is measured. The half decay exposure is classified in accordance with the following standards. Tables 2 and 3 list the results.

G1: Half decay exposure is 0.10 μJ/cm² or less.
G2: Half decay exposure is more than 0.10 μJ/cm² and 0.13 μJ/cm² or less.
G3: Half decay exposure is more than 0.13 μJ/cm² and 0.15 μJ/cm² or less.
G4: Half decay exposure is more than 0.15 μJ/cm² and 0.18 μJ/cm² or less.
G5: Half decay exposure is more than 0.18 μJ/cm².

Tables 2 and 3 also list the ratios A/C of the electrophotographic photosensitive members prepared in Examples and Comparative Examples above, which are determined when the proportion of the polycarboxylic acid component relative to all the components constituting the specific copolymer or vinyl copolymer is defined as A [mass %] and the content of the charge generating material relative to the specific copolymer or vinyl copolymer is defined as C [mass %].

TABLE 2

| | Charge generating material | Co-polymer | A/C | Evaluations Image density difference | Sensitivity |
|---|---|---|---|---|---|
| Example 1 | HOGaPc | (1) | $6.67 \times 10^{-3}$ | G0 | G1 |
| Example 2 | HOGaPc | (2) | $6.67 \times 10^{-3}$ | G0 | G1 |
| Example 3 | HOGaPc | (3) | $6.67 \times 10^{-3}$ | G0 | G1 |
| Example 4 | HOGaPc | (4) | $3.33 \times 10^{-3}$ | G0 | G2 |
| Example 5 | HOGaPc | (5) | $1.33 \times 10^{-2}$ | G0 | G1 |
| Example 6 | HOGaPc | (6) | $6.67 \times 10^{-3}$ | G1 | G1 |
| Example 7 | HOGaPc | (7) | $6.67 \times 10^{-3}$ | G1 | G1 |
| Example 8 | ClGaPc | (1) | $6.67 \times 10^{-3}$ | G1 | G2 |
| Example 9 | ClGaPc | (2) | $6.67 \times 10^{-3}$ | G1 | G2 |
| Example 10 | ClGaPc | (3) | $6.67 \times 10^{-3}$ | G2 | G1 |
| Example 11 | ClGaPc | (4) | $3.33 \times 10^{-3}$ | G1 | G2 |
| Example 12 | ClGaPc | (5) | $1.33 \times 10^{-2}$ | G1 | G2 |
| Example 13 | ClGaPc | (6) | $6.67 \times 10^{-3}$ | G2 | G1 |
| Example 14 | ClGaPc | (7) | $6.67 \times 10^{-3}$ | G2 | G1 |
| Example 15 | TiOPc | (1) | $6.67 \times 10^{-3}$ | G1 | G2 |
| Example 16 | TiOPc | (2) | $6.67 \times 10^{-3}$ | G1 | G2 |
| Example 17 | TiOPc | (3) | $6.67 \times 10^{-3}$ | G1 | G1 |
| Example 18 | TiOPc | (4) | $3.33 \times 10^{-3}$ | G1 | G2 |
| Example 19 | TiOPc | (5) | $1.33 \times 10^{-2}$ | G1 | G2 |
| Example 20 | TiOPc | (6) | $6.67 \times 10^{-3}$ | G2 | G1 |
| Example 21 | TiOPc | (7) | $6.67 \times 10^{-3}$ | G2 | G1 |

TABLE 3

| | Charge generating material | Copolymer | A/C | Evaluations Image density difference | Sensitivity |
|---|---|---|---|---|---|
| Comparative example 1 | HOGaPc | (C1) | $6.67 \times 10^{-3}$ | G4 | G1 |
| Comparative example 2 | HOGaPc | (C2) | $6.67 \times 10^{-3}$ | G4 | G2 |
| Comparative example 3 | HOGaPc | (C3) | $6.67 \times 10^{-3}$ | G4 | G1 |
| Comparative example 4 | HOGaPc | (C4) | $3.33 \times 10^{-3}$ | G4 | G2 |
| Comparative example 5 | HOGaPc | (C5) | $1.33 \times 10^{-2}$ | G4 | G1 |
| Comparative example 6 | HOGaPc | (C6) | $3.33 \times 10^{-3}$ | G5 | G1 |
| Comparative example 7 | HOGaPc | (C7) | $1.33 \times 10^{-2}$ | G5 | G1 |
| Comparative example 8 | HOGaPc | (8) | $1.33 \times 10^{-2}$ | G5 | G1 |
| Comparative example 9 | HOGaPc | (9) | $3.33 \times 10^{-3}$ | G6 | G1 |
| Comparative example 10 | HOGaPc | (C8) | $1.33 \times 10^{-2}$ | G4 | G3 |
| Comparative example 11 | HOGaPc | (C9) | $8.67 \times 10^{-2}$ | G5 | G4 |

TABLE 3-continued

|  | Charge generating material | Copolymer | A/C | Image density difference | Sensitivity |
|---|---|---|---|---|---|
| Comparative example 12 | ClGaPc | (C1) | $6.67 \times 10^{-3}$ | G4 | G3 |
| Comparative example 13 | ClGaPc | (C2) | $6.67 \times 10^{-3}$ | G4 | G3 |
| Comparative example 14 | ClGaPc | (C3) | $6.67 \times 10^{-3}$ | G4 | G3 |
| Comparative example 15 | ClGaPc | (C4) | $3.33 \times 10^{-3}$ | G4 | G4 |
| Comparative example 16 | ClGaPc | (C5) | $1.33 \times 10^{-2}$ | G4 | G4 |
| Comparative example 17 | ClGaPc | (C6) | $3.33 \times 10^{-3}$ | G5 | G2 |
| Comparative example 18 | ClGaPc | (C7) | $1.33 \times 10^{-2}$ | G5 | G2 |
| Comparative example 19 | TiOPc | (C1) | $6.67 \times 10^{-3}$ | G4 | G3 |
| Comparative example 20 | TiOPc | (C2) | $6.67 \times 10^{-3}$ | G4 | G3 |
| Comparative example 21 | TiOPc | (C3) | $6.67 \times 10^{-3}$ | G4 | G3 |
| Comparative example 22 | TiOPc | (C4) | $3.33 \times 10^{-3}$ | G4 | G5 |
| Comparative example 23 | TiOPc | (C5) | $1.33 \times 10^{-2}$ | G4 | G4 |
| Comparative example 24 | TiOPc | (C6) | $3.33 \times 10^{-3}$ | G5 | G2 |
| Comparative example 25 | TiOPc | (C7) | $1.33 \times 10^{-2}$ | G5 | G2 |

The above results confirm that each of the electrophotographic photosensitive members prepared in Examples above reduces the difference in image density along the axial direction of the electrophotographic photosensitive member compared with the electrophotographic photosensitive members prepared in Comparative Examples above.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An electrophotographic photosensitive member comprising:
   a conductive support;
   a charge generation layer disposed on the conductive support, the charge generation layer including:
      a charge generating material; and
      a vinyl copolymer, the vinyl copolymer including:
         a structural unit including a chlorine atom,
         a structural unit including an acyloxy group, and
         a structural unit including an aromatic polycarboxylic acid structure,
   a proportion of the structural unit including a chlorine atom to all the structural units constituting the vinyl copolymer being 80% by mass or more, a proportion of the structural unit including an aromatic polycarboxylic acid structure to all the structural units constituting the vinyl copolymer being 0.5% by mass or more; and
   a charge transport layer disposed on the charge generation layer, the charge transport layer including:
      a charge transporting material; and
      a binder resin.

2. The electrophotographic photosensitive member according to claim 1,
   wherein the proportion of the structural unit including a chlorine atom to all the structural units constituting the vinyl copolymer is 80% by mass or more and 88% by mass or less.

3. The electrophotographic photosensitive member according to claim 2,
   wherein the proportion of the structural unit including a chlorine atom to all the structural units constituting the vinyl copolymer is 80% by mass or more and 87% by mass or less.

4. The electrophotographic photosensitive member according to claim 1,
   wherein, when the proportion of the structural unit including an aromatic polycarboxylic acid structure to all the structural units constituting the vinyl copolymer is defined as A [mass %] and a content of the charge generating material relative to the vinyl copolymer is defined as C [mass %], a ratio A/C is $3.00 \times 10^{-3}$ or more and $1.40 \times 10^{-2}$ or less.

5. The electrophotographic photosensitive member according to claim 2,
   wherein, when the proportion of the structural unit including an aromatic polycarboxylic acid structure to all the structural units constituting the vinyl copolymer is defined as A [mass %] and a content of the charge generating material relative to the vinyl copolymer is defined as C [mass %], a ratio A/C is $3.00 \times 10^{-3}$ or more and $1.40 \times 10^{-2}$ or less.

6. The electrophotographic photosensitive member according to claim 3,
   wherein, when the proportion of the structural unit including an aromatic polycarboxylic acid structure to all the structural units constituting the vinyl copolymer is defined as A [mass %] and a content of the charge generating material relative to the vinyl copolymer is defined as C [mass %], a ratio A/C is $3.00 \times 10^{-3}$ or more and $1.40 \times 10^{-2}$ or less.

7. The electrophotographic photosensitive member according to claim 1,
   wherein the structural unit including a chlorine atom is represented by General Formula (1), and the structural unit including an acyloxy group is represented by General Formula (2),

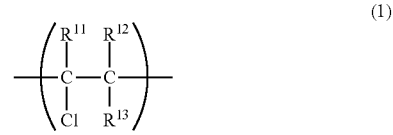
(1)

-continued

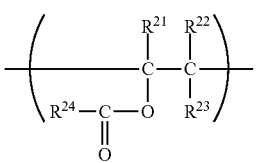
(2)

where, in General Formula (1), $R^{11}$ to $R^{13}$ each independently represent a hydrogen atom or an alkyl group having 1 to 5 carbon atoms; and, in General Formula (2), $R^{21}$ to $R^{23}$ each independently represent a hydrogen atom or an alkyl group having 1 to 5 carbon atoms, and $R^{24}$ represents an alkyl group having 1 to 5 carbon atoms.

8. The electrophotographic photosensitive member according to claim 2,
wherein the structural unit including a chlorine atom is represented by General Formula (1), and the structural unit including an acyloxy group is represented by General Formula (2),

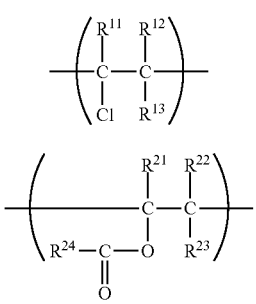
(1)

(2)

where, in General Formula (1), $R^{11}$ to $R^{13}$ each independently represent a hydrogen atom or an alkyl group having 1 to 5 carbon atoms; and, in General Formula (2), $R^{21}$ to $R^{23}$ each independently represent a hydrogen atom or an alkyl group having 1 to 5 carbon atoms, and $R^{24}$ represents an alkyl group having 1 to 5 carbon atoms.

9. The electrophotographic photosensitive member according to claim 3,
wherein the structural unit including a chlorine atom is represented by General Formula (1), and the structural unit including an acyloxy group is represented by General Formula (2),

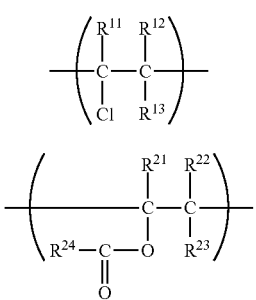
(1)

(2)

where, in General Formula (1), $R^{11}$ to $R^{13}$ each independently represent a hydrogen atom or an alkyl group having 1 to 5 carbon atoms; and, in General Formula (2), $R^{21}$ to $R^{23}$ each independently represent a hydrogen atom or an alkyl group having 1 to 5 carbon atoms, and $R^{24}$ represents an alkyl group having 1 to 5 carbon atoms.

10. The electrophotographic photosensitive member according to claim 4,
wherein the structural unit including a chlorine atom is represented by General Formula (1), and the structural unit including an acyloxy group is represented by General Formula (2),

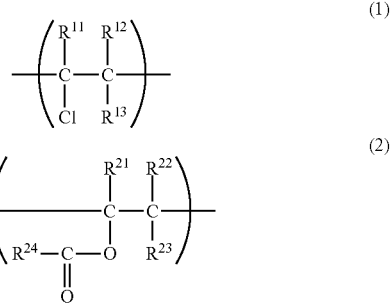
(1)

(2)

where, in General Formula (1), $R^{11}$ to $R^{13}$ each independently represent a hydrogen atom or an alkyl group having 1 to 5 carbon atoms; and, in General Formula (2), $R^{21}$ to $R^{23}$ each independently represent a hydrogen atom or an alkyl group having 1 to 5 carbon atoms, and $R^{24}$ represents an alkyl group having 1 to 5 carbon atoms.

11. The electrophotographic photosensitive member according to claim 5,
wherein the structural unit including a chlorine atom is represented by General Formula (1), and the structural unit including an acyloxy group is represented by General Formula (2),

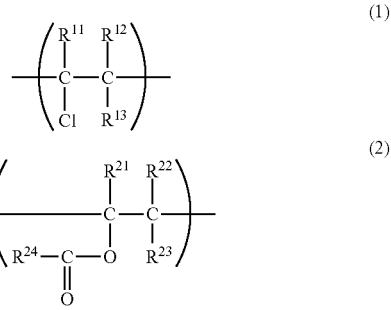
(1)

(2)

where, in General Formula (1), $R^{11}$ to $R^{13}$ each independently represent a hydrogen atom or an alkyl group having 1 to 5 carbon atoms; and, in General Formula (2), $R^{21}$ to $R^{23}$ each independently represent a hydrogen atom or an alkyl group having 1 to 5 carbon atoms, and $R^{24}$ represents an alkyl group having 1 to 5 carbon atoms.

12. The electrophotographic photosensitive member according to claim 6, wherein the structural unit including a chlorine atom is represented by General Formula (1), and the structural unit including an acyloxy group is represented by General Formula (2),

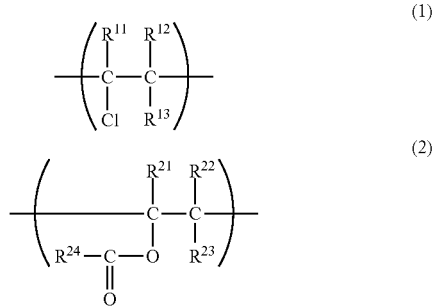

where, in General Formula (1), $R^{11}$ to $R^{13}$ each independently represent a hydrogen atom or an alkyl group having 1 to 5 carbon atoms; and, in General Formula (2), $R^{21}$ to $R^{23}$ each independently represent a hydrogen atom or an alkyl group having 1 to 5 carbon atoms, and $R^{24}$ represents an alkyl group having 1 to 5 carbon atoms.

13. The electrophotographic photosensitive member according to claim 7, wherein, in General Formula (1), all of $R^{11}$ to $R^{13}$ represent a hydrogen atom; and, in General Formula (2), all of $R^{21}$ to $R^{23}$ represent a hydrogen atom, and $R^{24}$ represents a methyl group.

14. The electrophotographic photosensitive member according to claim 1, wherein the structural unit including an aromatic polycarboxylic acid structure is a structural unit including a phthalic acid structure.

15. A process cartridge detachably attachable to an image forming apparatus, the process cartridge comprising: the electrophotographic photosensitive member according to claim 1.

16. An image forming apparatus comprising:
the electrophotographic photosensitive member according to claim 1;
a charging unit that charges a surface of the electrophotographic photosensitive member;
an electrostatic latent image forming unit that forms an electrostatic latent image on the charged surface of the electrophotographic photosensitive member;
a developing unit that develops the electrostatic latent image formed on the surface of the electrophotographic photosensitive member with a developer including a toner in order to form a toner image; and
a transfer unit that transfers the toner image onto a surface of a recording medium.

* * * * *